(12) United States Patent
Tai et al.

(10) Patent No.: US 6,720,053 B2
(45) Date of Patent: *Apr. 13, 2004

(54) COINJECTION STRETCH BLOW MOLDED CONTAINER

(75) Inventors: Shinji Tai, Kurashiki (JP); Hiroyuki Shimo, Kurashiki (JP); Nahoto Hayashi, Kurashiki (JP); Masako Chigami, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/909,832

(22) Filed: Jul. 23, 2001

(65) Prior Publication Data

US 2002/0064617 A1 May 30, 2002

Related U.S. Application Data

(63) Continuation of application No. 09/288,853, filed on Apr. 9, 1999, now Pat. No. 6,395,358.

(30) Foreign Application Priority Data

Apr. 9, 1998 (JP) ............................................ 10-097433

(51) Int. Cl.⁷ .......................... B32B 27/30; B32B 27/06
(52) U.S. Cl. ..................... 428/36.7; 428/35.7; 428/36.6
(58) Field of Search ............................... 428/35.7, 36.6, 428/36.7, 447, 480, 483, 704

(56) References Cited

U.S. PATENT DOCUMENTS

| | | | |
|---|---|---|---|
| 4,082,854 A | 4/1978 | Yamada et al. ............. 426/106 |
| 4,133,801 A | 1/1979 | Morimatsu et al. ......... 528/230 |
| 4,481,238 A | 11/1984 | Fagerburg et al. ............ 428/35 |
| 4,535,901 A | 8/1985 | Okudaira et al. .......... 215/12.2 |
| 4,646,925 A | 3/1987 | Nohara .................... 428/542.8 |
| 4,855,181 A | 8/1989 | Shimo et al. ............... 428/336 |
| 4,977,004 A | 12/1990 | Bettle, III et al. ......... 215/12.2 |
| 5,221,566 A | 6/1993 | Tokoh et al. .............. 428/34.5 |
| 5,972,447 A | 10/1999 | Hata et al. ................. 428/35.7 |
| 6,033,749 A | 3/2000 | Hata et al. ................. 428/36.7 |
| 6,294,602 B1 | 9/2001 | Shimo et al. ............... 524/394 |

OTHER PUBLICATIONS

Derwent Publications, AN 1994–086078, JP 06 009763, Jan. 18, 1994.

Primary Examiner—Harold Pyon
Assistant Examiner—Sow-Fun Hon
(74) Attorney, Agent, or Firm—Oblon, Spivak, McClelland, Maier & Neustadt, P.C.

(57) ABSTRACT

Coinjection stretch blow molded containers containing thermoplastic polyester resin and an EVOH resin are obtained, which have greatly improved impact delamination resistance. The containers comprise a thermoplastic polyester layer (layer a) and an ethylene-vinyl alcohol copolymer layer (layer b), with the layer a being kept in direct contact with the both surfaces of the layer b, wherein the ethylene-vinyl alcohol copolymer satisfies the following formulae (1) and (2) and its differential scanning calorimetry (DSC) gives a single peak f or crystal fusion:

$$25 \leq ETb \leq 48 \quad (1)$$

$$92 \leq SDb \leq 99 \quad (2)$$

wherein ETb indicates the ethylene content (mol %) of the ethylene-vinyl alcohol copolymer, and SDb indicates the degree of saponification (%) of the ethylene-vinyl alcohol copolymer.

10 Claims, 8 Drawing Sheets

The XPS chart of the exposed EVOH layer at its surface in Comparative Example 1

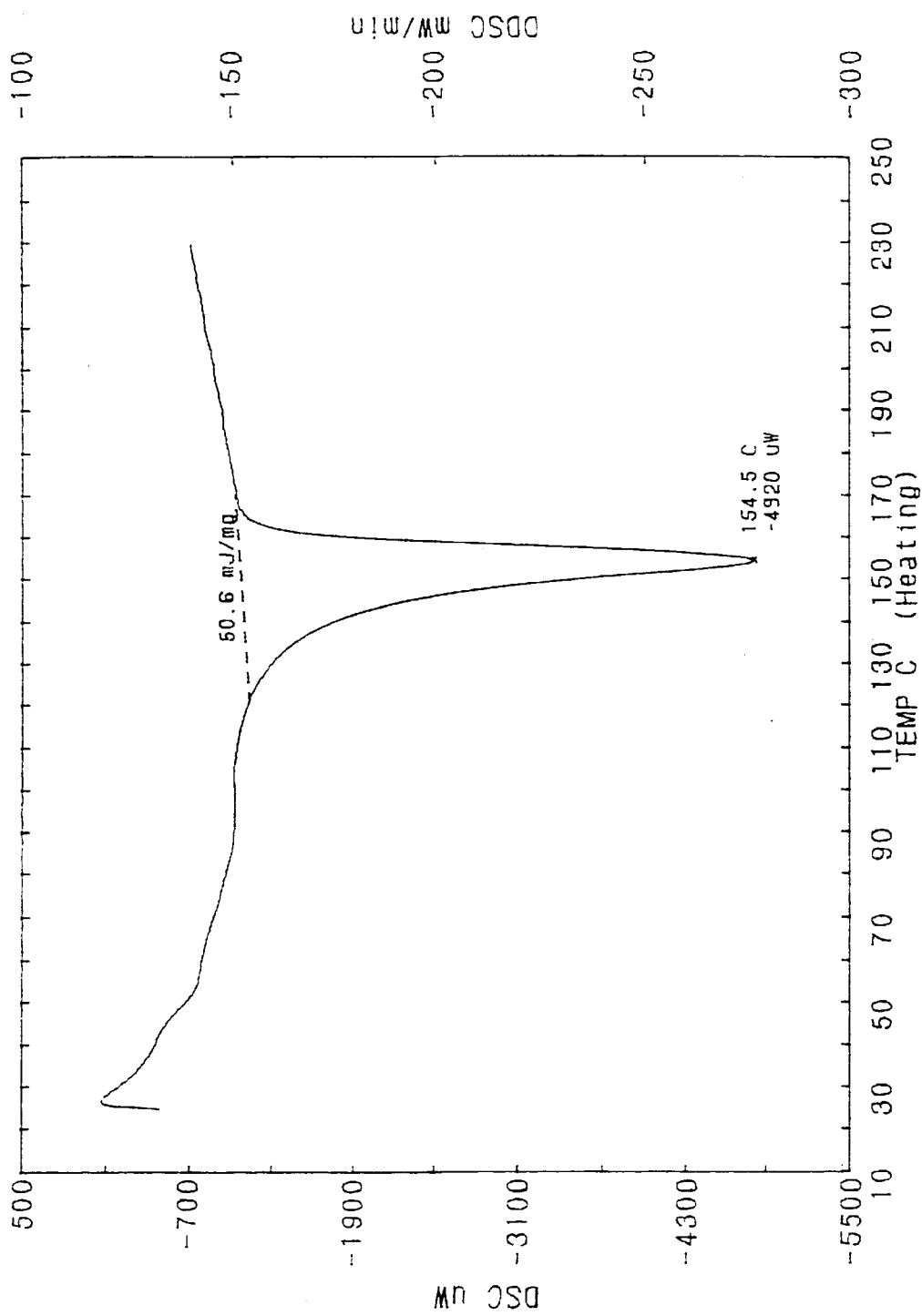
Fig.1 The DSC chart of the EVOH resin in Example 1

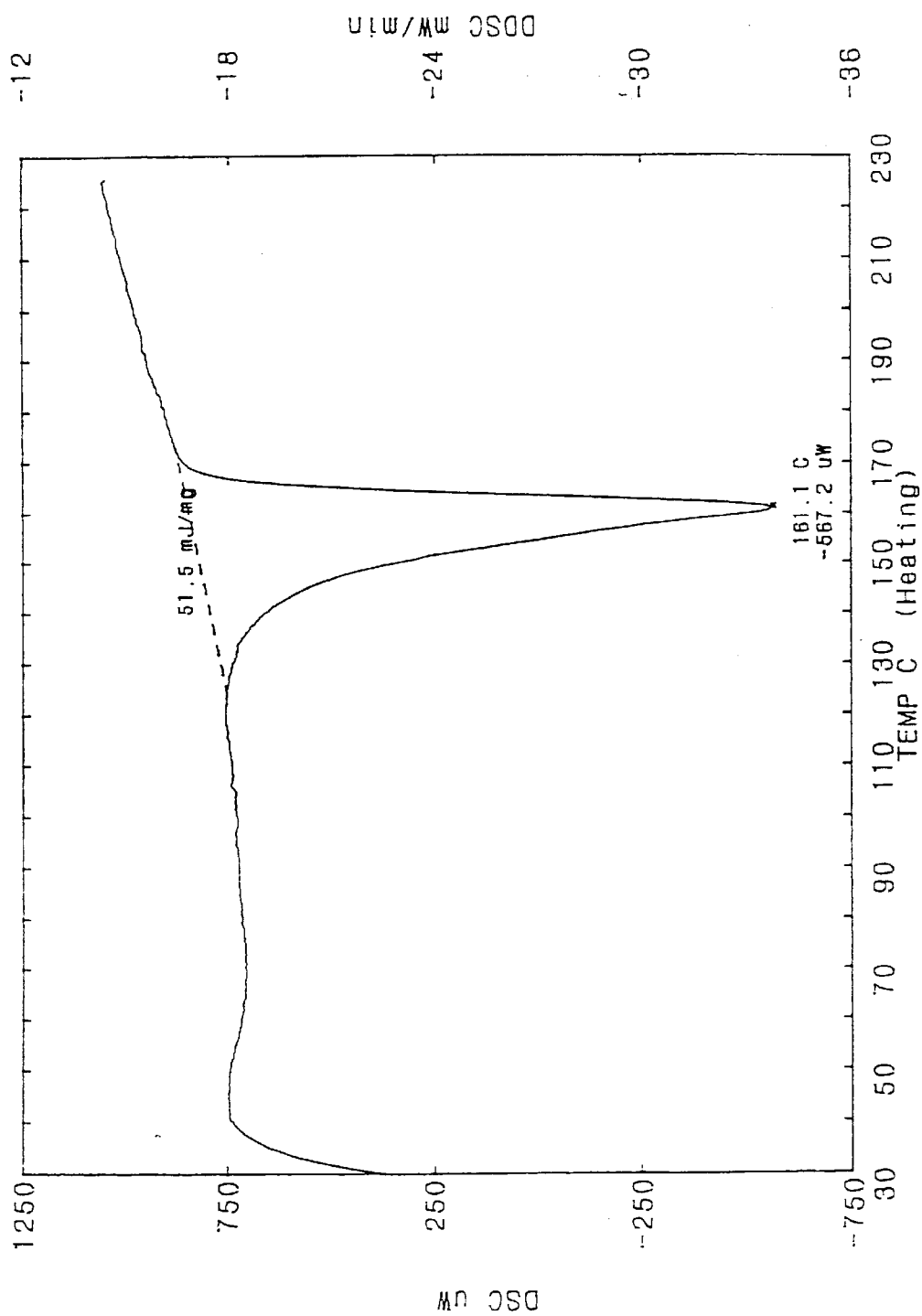
Fig. 2 The DSC chart of the EVOH composition in Example 11

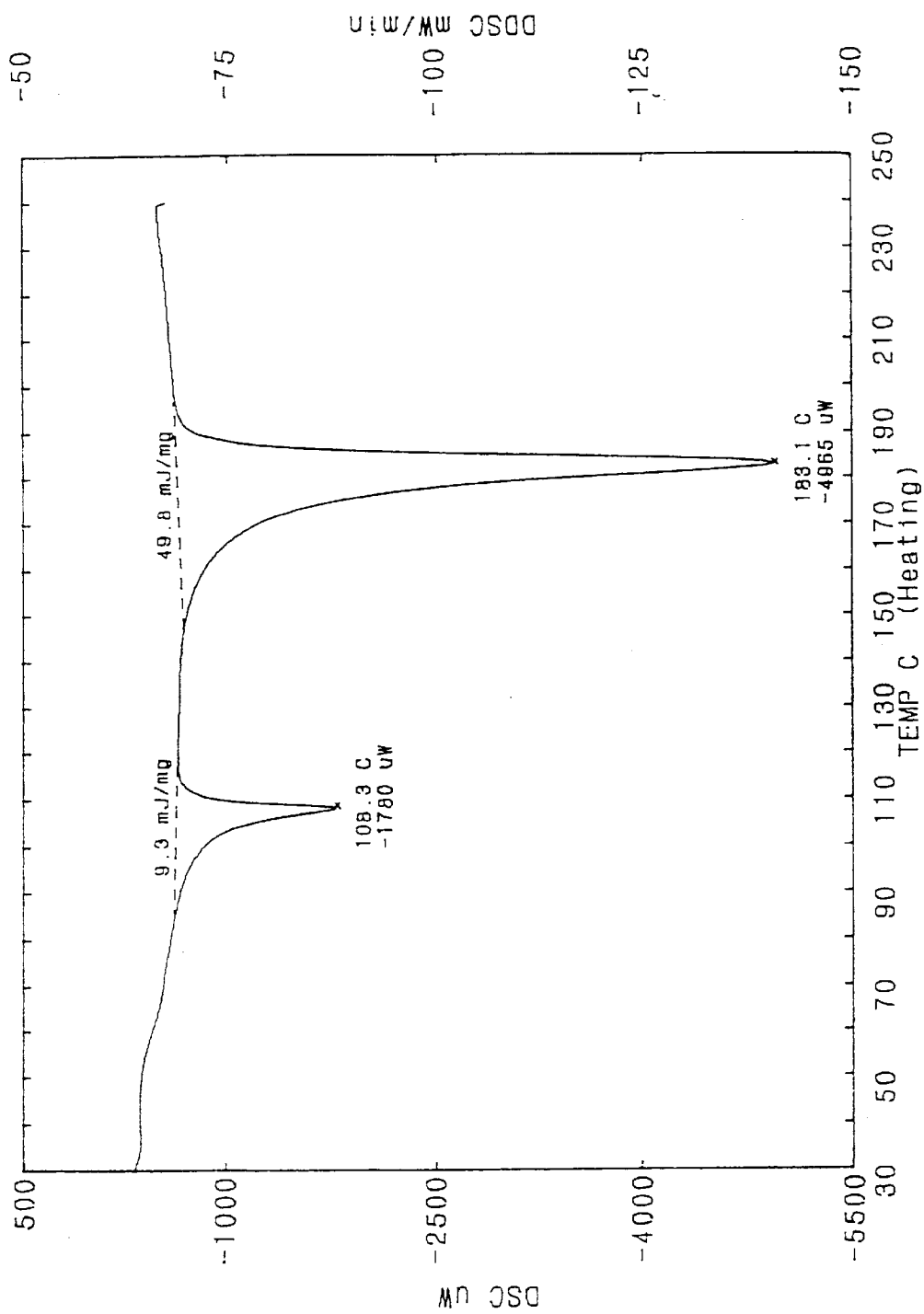
Fig. 3 The DSC chart of the EVOH composition in Comparative Example 9

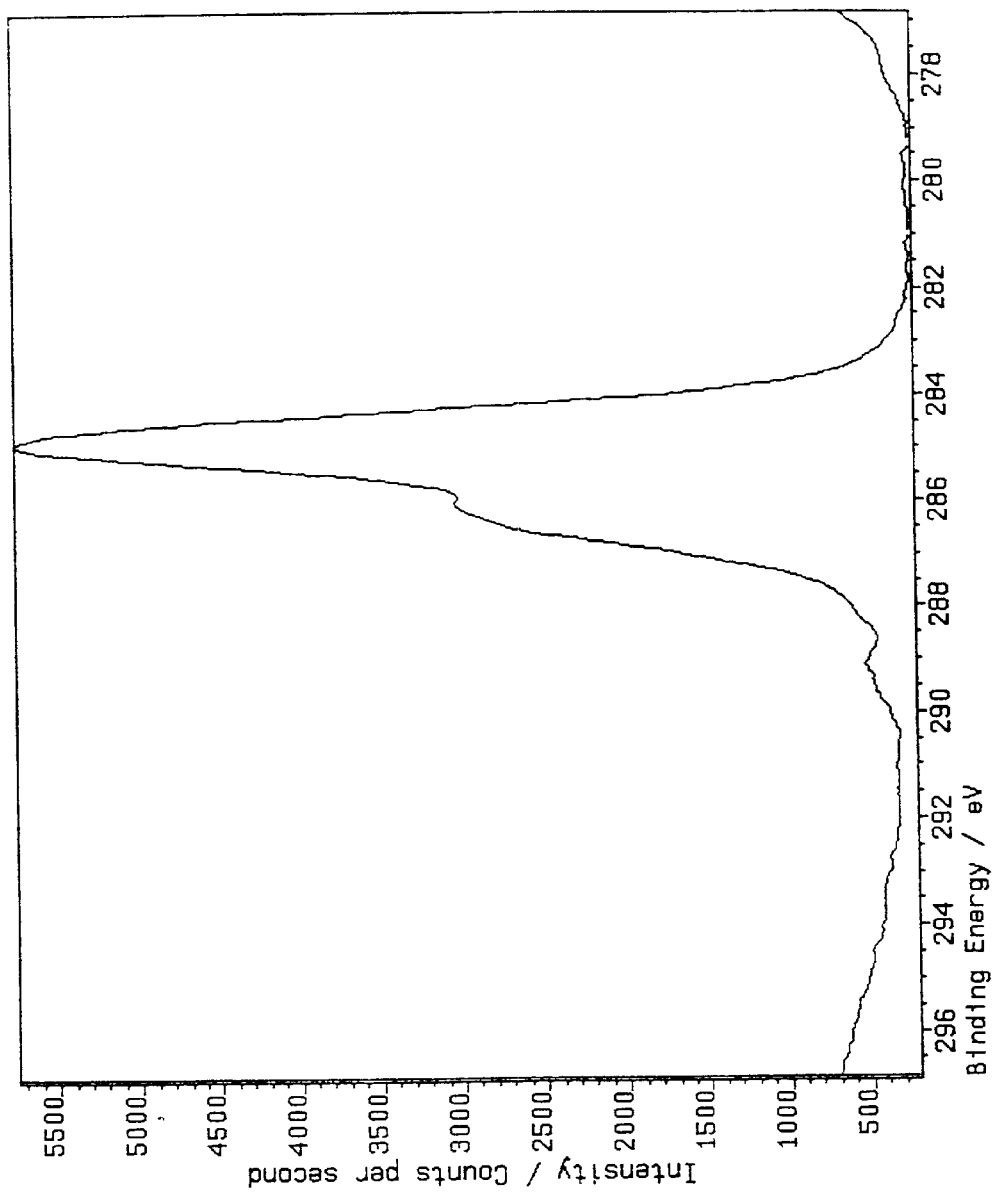
Fig. 4 The XPS chart of the exposed EVOH layer at its surface in Example 1

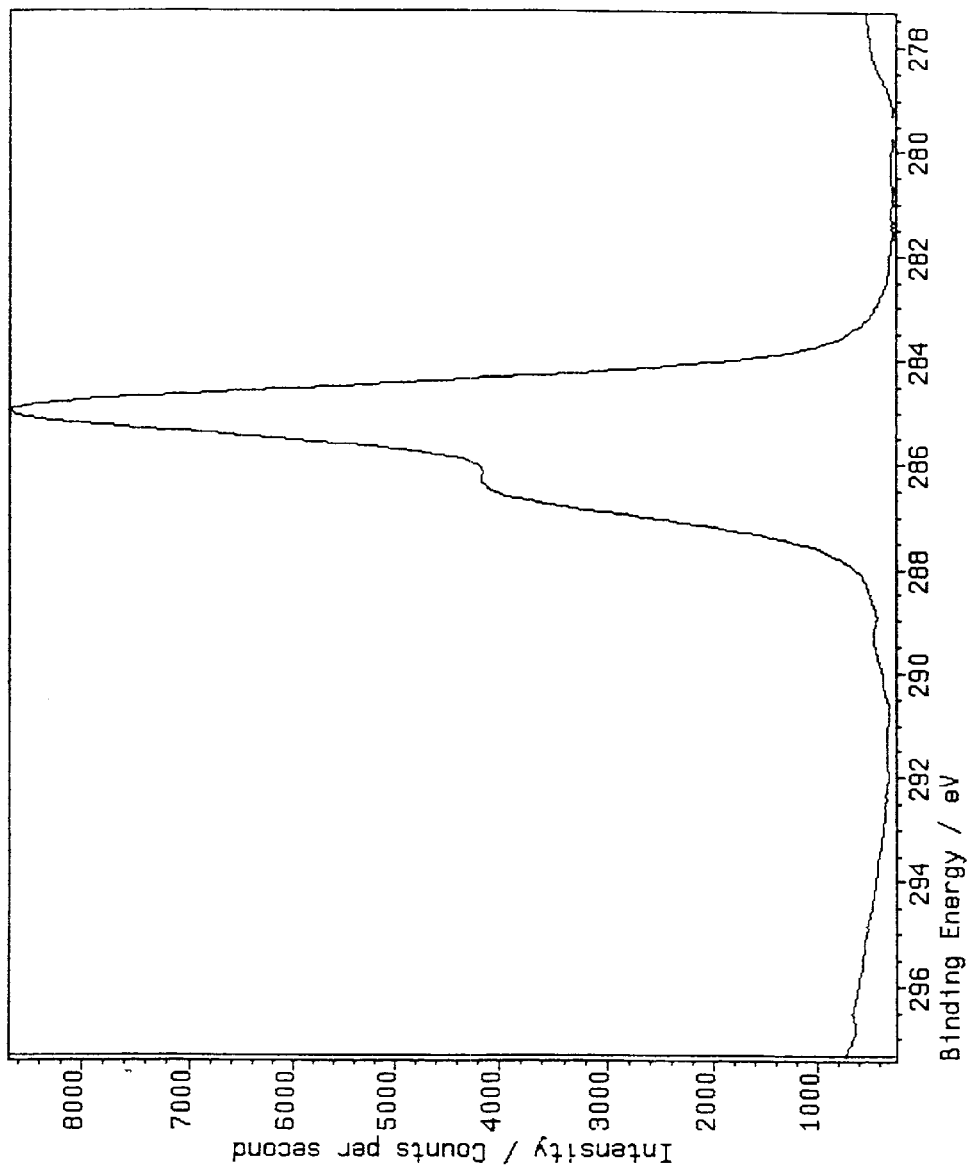
Fig. 5 The XPS chart of the exposed EVOH layer at its surface in Example 11

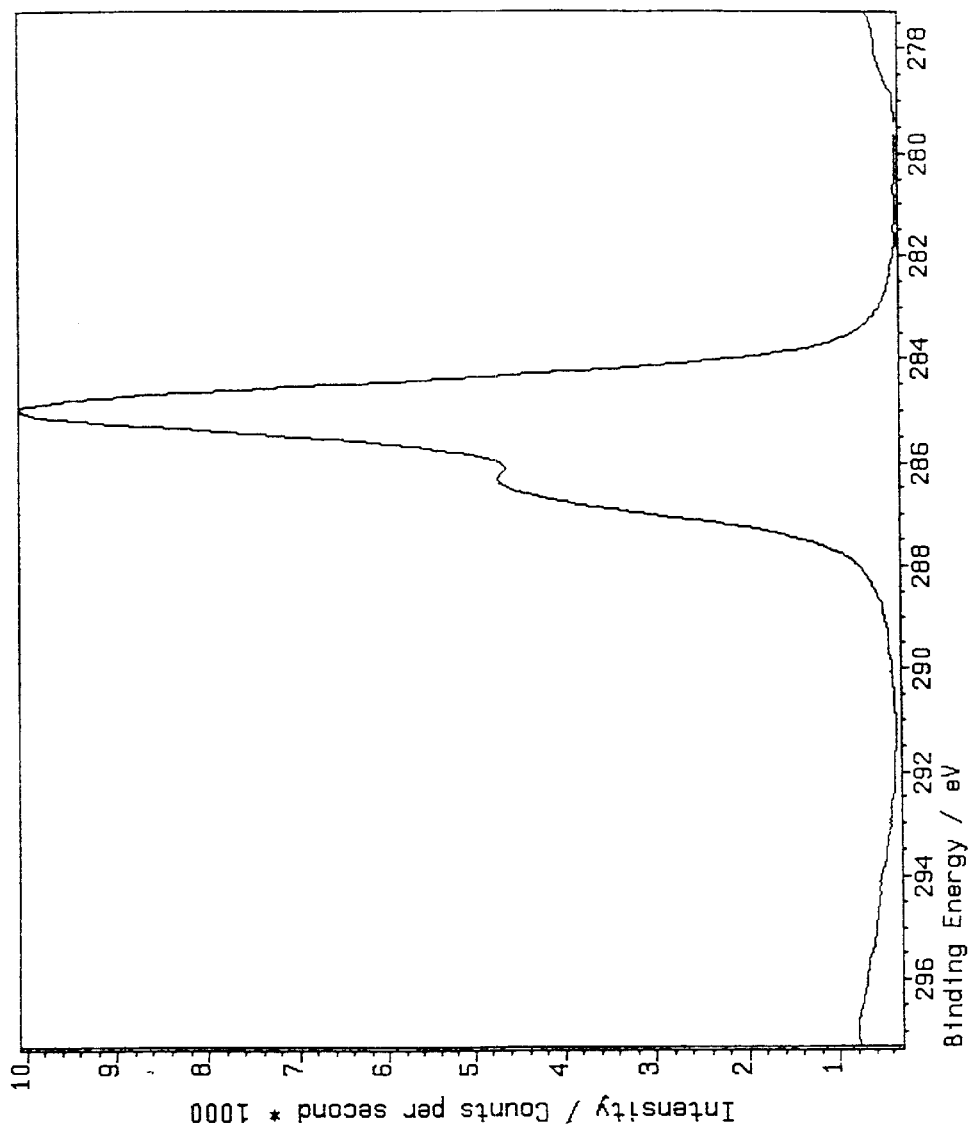
Fig. 6 The XPS chart of the exposed EVOH layer at its surface in Comparative Example 1

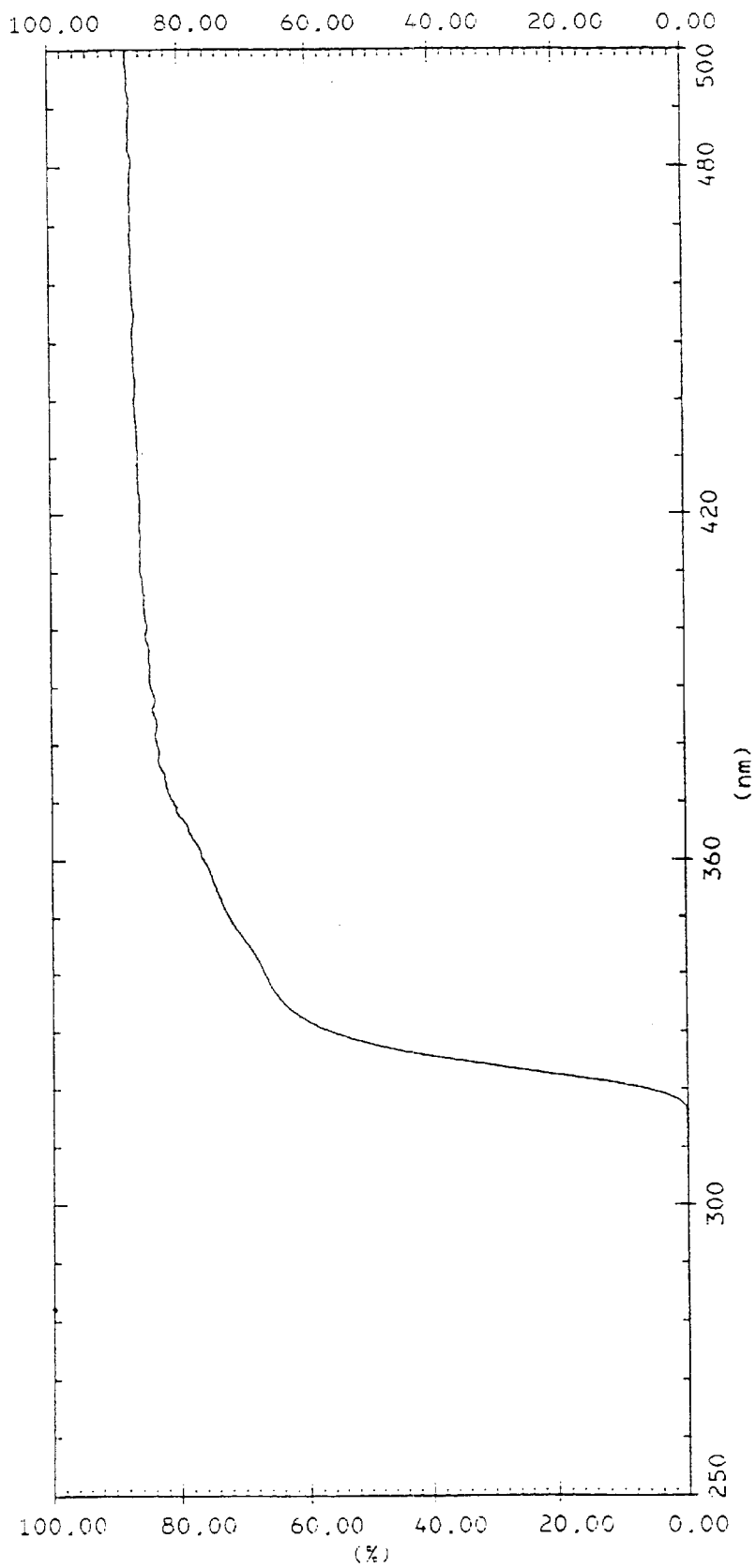
Fig. 7 The spectral transmission chart of the sheet of the polyester resin in Example 1

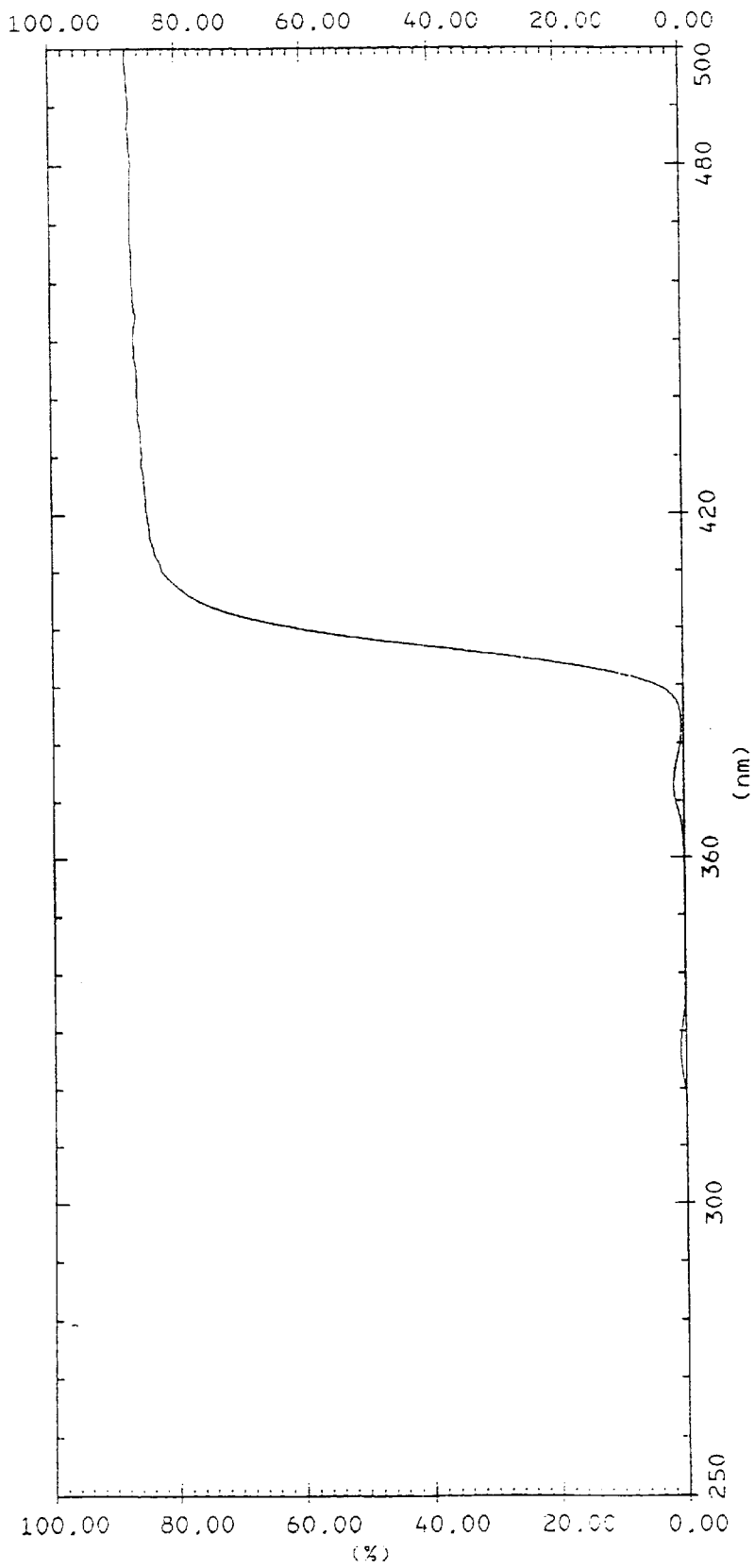
Fig. 8  The spectral transmission chart of the sheet of the polyester resin in Example 5

COINJECTION STRETCH BLOW MOLDED CONTAINER

This application is a continuation of 09/288,853 filed Apr. 9, 1999 which matured into U.S. Pat. No. 6,395,358, and claims priority to JP 10-097433 filed Apr. 9, 1998.

BACKGROUND OF THE INVENTION

1. Field of the Invention

The present invention relates to coinjection stretch blow molded containers with greatly improved impact delamination resistance, which have good gas barrier properties against oxygen, carbon dioxide gas and others, good moisture-proofness, good aroma retentivity, good flavor barrier properties and good appearance, and which are used as containers for drinks, foods, and cosmetics, for example.

2. Description of the Background

Thermoplastic polyester (PES) containers as produced through stretch blow molding have various excellent properties including good transparency, good mechanical characteristics and good flavor barrier properties, and are sanitary and safe for daily use as releasing few residual monomers and other harmful additives. Therefore, they have many applications in various fields. However, since their gas barrier properties are not always satisfactory, drinks, foods and others in them could be stored only a relatively short period of time.

In order to overcome the drawback, various methods of combining a thermoplastic polyester with an ethylene-vinyl alcohol copolymer (EVOH) with good gas barrier properties to give laminated structures have heretofore been proposed. Prior to stretch blowing, a parison is first formed. For forming the parison, one may use coinjection molding, coextrusion molding, multi-stage injection molding, for example. Of these, coinjection molding is characterized by being effected in simple a apparatus, yielding few scraps, such as trimmings and others, and that the moldings produced may have a structure with an EVOH layer completely covered with a PES layer or the like and therefore, even though the moldings have no adhesive resin (Ad) layer between the EVOH layer and the PES layer or the like, they could be well multi-layered containers with seemingly good appearance owing to the adhesion effect of the ambient atmospheric pressure.

However, when conventional containers filled with drinks, foods and others are shocked, for example, by dropping them, the PES layer and the EVOH layer constituting them are easily delaminated, thereby worsening the appearance of the containers. Due to this problem, coinjection molded containers with an Ad layer-having structure of PES/Ad/EVOH/Ad/PES (see JP-A-56-501040), those with an Ad layer-having structure of PES/Ad/EVOH/Ad/PES/Ad/EVOH/Ad/PES (see JP-A-50-135169, JP-A-61-152411, JP-A-61-152412, JP-A-61-259944) and the like have been investigated. However, the equipment for producing such containers is often extremely complicated, and, in addition, controlling the thickness of each layer constituting them is often difficult. Therefore, these containers are inferior to others having no Ad layer in view of production costs and productivity.

Other methods have also been investigated of blending EVOH and other resins for increasing the delamination resistance of containers with no Ad layer. For example, in JP-A-1-176554, a method of blending EVOH with a polyamide-ester type thermoplastic resin is disclosed. In JP-A-1-182023, a method of blending EVOH with a metal-containing polyester type thermoplastic resin is disclosed. Finally, in JP-A-3-175032, a method of blending EVOH with a thermoplastic polyurethane is disclosed. However, blending EVOH with such other resins producing containers lowers the transparency of the containers produced, consequently, the containers have extremely bad appearance. In addition, the blending increases the production costs, and, depending on the type of the resins to be blended, other problems, such as poor melt stability of the blends, occur.

In JP-A-3-175033, a method is described of adding at least one salt selected from titanium salts, cobalt salts, manganese salts, antimony salts and germanium salts to EVOH for increasing delamination resistance of containers with no Ad layer. However, this method is still problematic in that the effect of a such a metal salt as used therein for improving the delamination resistance of containers is not satisfactory and, in addition, the melt stability of EVOH with the metal salt added thereto is lowered.

In JP-A-1-204736, a method is described of blending an essential component of EVOH with a minor component of EVOH for increasing the delamination resistance of containers with no Ad layer, in which the minor component EVOH has a larger ethylene content, a lower degree of saponification, a lower melting point and a larger melt index than the essential component EVOH. However, blending two different types of EVOH, between which the difference in the ethylene content is 30 mol % or more, as in Examples of the publication, lowers the transparency of the containers produced, and the containers will have extremely bed appearance. In addition, the blending increases the production costs, and, causes the problem that the melt stability of the blends is poor. This is described in Comparative Example 9 of this application.

SUMMARY OF THE INVENTION

Accordingly, it is an object of the present invention to provide multi-layered containers with good transparency and good gas barrier properties, which are produced through stretch blow molding of a parison as prepared by coinjection molding of a polyester resin and an EVOH resin, and in which the interlayer delamination under shock is prevented even though the containers have no adhesive resin layer.

The present inventors have studied the production of multi-layered containers through coinjection molding and have prepared a multi-layered parison (preform) having a structure that contains a polyester resin layer and an EVOH layer with the former being in direct contact with the both surfaces of the latter, followed by stretch blow molding of the resulting multi-layered parison into a container, for which we have assiduously investigated the resins to tee selected, the molding and working conditions to be employed and others, for the purpose of preventing the interlayer delamination between the EVOH layer and the polyester resin layer in the containers produced, when they are shocked.

As a result, it has been surprisingly discovered that a coinjection stretch blow molded container, which contains a thermoplastic polyester layer (layer a) and an ethylene-vinyl alcohol copolymer layer (layer b), with the layer a being kept in direct contact with the both surfaces of the layer b, and in which the ethylene-vinyl alcohol copolymer satisfies the following formulae (1) and (2) and its differential scanning calorimetry (DSC) gives a single peak for crystal fusion, and, moreover, has excellent impact delamination resistance:

$$25 \leq ETb \leq 48 \quad (1)$$

$$92 \leq SDb \leq 99 \quad (2)$$

wherein;
ETb indicates the ethylene content (mol %) of the ethylene-vinyl alcohol copolymer, and
SDb indicates the degree of saponification (%) of the ethylene-vinyl alcohol copolymer.

It has also surprisingly been discovered that a coinjection stretch blow Its molded container, which contains a thermoplastic polyester layer (layer a) and an ethylene-vinyl alcohol copolymer layer (layer b), with the layer a being kept in direct contact with the both surfaces of the layer b, and in which the X-ray photoelectron spectroscopy (XPS) of the surface of the layer b as exposed by peeling the layers a and b of the body of the container at their interface gives a pattern that satisfies the following formula (3), also has excellent impact delamination resistance:

$$0.015 \leq PC/(PA+PB+PC) \leq 0.3 \quad (3)$$

wherein;
PA indicates the area of the highest peak (peak A) of the peaks for the binding energy of C is electrons,
PB indicates the area of the peak (peak B) appearing in the side higher by from about 1.1 to 1.8 eV than the position of the peak A, and
PC indicates the area of the peak (peak C) appearing in the side higher by from about 3.6 to 4.3 eV than the position of the peak A.

BRIEF DESCRIPTION OF THE DRAWINGS

FIG. 1 shows the DSC chart of the EVOH resin in Example 1.

FIG. 2 shows the DSC chart of the EVOH composition in 11.

FIG. 3 shows the DSC chart of the EVOH composition in Comparative Example 9.

FIG. 4 shows the XPS chart of the exposed EVOH layer at its surface in Example 1.

FIG. 5 shows the XPS chart of the exposed EVOH layer at its surface in Example 11.

FIG. 6 shows the XPS chart of the exposed EVOH layer at its surface in Comparative Example 1.

FIG. 7 shows the spectral transmission chart of the sheet of the polyester resin in Example 1.

FIG. 8 shows the spectral transmission chart of the sheet of the polyester resin in Example 5.

DETAILED DESCRIPTION OF THE PREFERRED EMBODIMENTS

In the present containers, preferably, the thermoplastic polyester has an intrinsic viscosity IVa (dl/g) that satisfies the following formula (4), and the ethylene-vinyl alcohol copolymer has a melt index MIB (g/10 min. at 190° C. under a load of 2,160 g) that satisfies the following formula (5):

$$0.60 \leq IVa \leq 0.90 \quad (4)$$

$$0.1 \leq MIb \leq 10 \quad (5)$$

Also preferably, the ethylene-vinyl alcohol copolymer therein is a mixture of two ethylene-vinyl alcohol copolymers (b1, b2) in a ratio by weight (b1/b2) falling between between 10/90 and 90/10, and satisfies the following formulae (6) to (11):

$$25 \leq ETb1 \leq 48 \quad (6)$$

$$99 \leq SDb1 \quad (7)$$

$$25 \leq ETb2 \leq 48 \quad (8)$$

$$92 \leq SDb2 \leq 99 \quad (9)$$

$$|Etb2-ETb1| \leq 8 \quad (10)$$

$$1 \leq (SDb1-SDb2) \leq 8 \quad (11)$$

wherein;
ETb1 indicates the ethylene content (mol %) of the ethylene-vinyl alcohol copolymer (b1),
SDb1 indicates the degree of saponification (%) of the ethylene-vinyl alcohol copolymer (b1),
ETb2 indicates the ethylene content (mol %) of the ethylene-vinyl alcohol copolymer (b2), and
SDb2 indicates the degree of saponification (%) of the ethylene-vinyl alcohol copolymer (b2).

Still preferably, the ethylene-vinyl alcohol copolymer is copolymerized with from about 0.0002 to 0.2 mol % of a vinylsilane compound, or contains a boron compound in an amount of from about 20 to 2000 ppm in terms of the boron element.

More preferably, the thermoplastic polyester layer constituting the container body has a density Da (g/cm$^3$) that satisfies the following formula (12), and the ethylene-vinyl alcohol copolymer layer constituting it has a density Db(g/cm$^3$) that satisfies the following formula (13):

$$1.35 \leq Da \leq 1.37 \quad (12)$$

$$1.11 \leq Db \leq 1.20 \quad (13)$$

Still preferably, the thermoplastic polyester consists essentially of an ethylene terephthalate component and its melting point TMa (° C.) satisfies the following formula (14):

$$240 \leq TMa \leq 250 \quad (14)$$

Still preferably, the thermoplastic polyester consists essentially of en ethylene terephthalate component end contains a naphthalenedicarboxylic acid component in an amount of from 0.1 to 15 mol % relative to the sum total of all dicarboxylic acid components constituting it, or it is prepared through polymerization using a catalyst of a germanium compound.

Still preferably, the container body has a haze of at most 5%.

As noted above, the multi-layered container of the invention contains a thermoplastic polyester layer (layer a) and an ethylene-vinyl alcohol copolymer layer (layer b).

As the polyester resin for the thermoplastic polyester layer (layer a) in the present invention, employable is a condensed polymer that consists essentially of an aromatic dicarboxylic acid or its alkyl ester end a diol. For more favorably attaining the object of the present invention, preferred is a polyester resin consisting essentially of an ethylene terephthalate component. In the polyester resin to be used for the layer a in the invention, in general, it is desirable that the total proportion (mol %) of terephthalic acid units and ethylene glycol units constituting the polyester is at least about 70 mol % relative to the total mols of all constituent units that constitute the polyester, more preferably at least about 90 mol %. If the total proportion of terephthalic acid units end ethylene glycol units constituting it is smaller than 70 mol %, the copolyester will be amorphous. When hot filled, stretched containers that comprise such an amorphous copolyester will greatly shrink, and have poor heat resistance. In addition, their strength is lowered. Moreover, while being polymerized in a solid phase to reduce the oligomers therein, the resin will often soften to be glutinous, and its production is often difficult.

The polyester resin for the layer a in the invention may be optionally copolymerized with any other bifunctional compound units except terephthalic acid units and ethylene glycol units, within the range not significantly interfering with the workability, the strength, the heat resistance and other properties of the resin. The proportion (mol %) of the additional units is preferably at most about 30 mol % relative to the total mols of all constituent units that constitute the polyester (A), more preferably at most about 20 mol %, even more preferably at most 10 mol %. As the preferred bifunctional compound units that may be in the resin, mentioned is at least one bifunctional compound unit selected from dicarboxylic acid units, diol units and hydroxycarboxylic acid units. Any and every bifunctional compound unit except terephthalic acid units and ethylene glycol units is employable for the purpose, including, for example, aliphatic bifunctional compound units, alicyclic bifunctional compound units and aromatic bifunctional compound units.

As examples of the aliphatic bifunctional compound units are divalent structure units to be derived from aliphatic dicarboxylic acids and their ester-forming derivatives, such as malonic acid, succinic acid, adipic acid, azelaic acid, sebacic acid, etc.; form aliphatic hydroxycarboxylic acids and their ester-forming derivatives, such as 10-hydroxyoctadecanoic acid, lactic acid, hydroxyacrylic acid, 2-hydroxy-2-methylpropionic acid, hydroxybutyric acid, etc.; and from aliphatic diols such as trimethylene glycol, tetramethylene glycol, hexamethylene glycol, neopentyl glycol, methylpentanediol, diethylene glycol, etc. Neopentyl glycol units are preferred as the aliphatic bifunctional compound units, since copolyesters comprising them are easy to produce and since the units do not lower the heat resistance of the multi-layered containers of the invention comprising them.

As examples of the alicyclic bifunctional compound units are divalent structure units to be derived from alicyclic dicarboxylic acids and their ester-forming derivatives, such as cyclohexanedicarboxylic acid, norbornenedicarboxylic acid, tricyclodecanedicarboxylic acid, etc.; alicyclic hydroxycarboxylic acids and their ester-forming derivatives such as hydroxymethylcyclohexanecarboxylic acid, hydroxymethylnorbornenecarboxylic acid, hydroxymethyltricyclodecanecarboxylic acid, etc.; alicyclic dials such as cyclohexanedimethanol, norbornenedimethanol, tricyclodecanedimethanol, etc. Cyclohexanedimethanol units or cyclohexanedicarboxylic acid units are preferred as the alicyclic bifunctional compound units, since copolyesters comprising them are easy to produce and since they improve the drop-impact strength of the multi-layered containers of the invention comprising them and much enhances the transparency thereof.

The cyclohexanedimethanol unit as referred to herein is meant to indicate at least one divalent unit selected from 1,2-cyclohexanedimethanol units, 1,3-cyclohexanedimethanol units and 1,4-cyclohexanedimethanol units. The cyclohexanedicarboxylic acid unit also referred to herein is to indicate at least one divalent unit selected from 1,2-cyclohexanedicarboxylic acid units, 1,3-cyclohexanedicarboxylic acid units and 1,4-cyclohexanedicarboxylic acid units.

Of the alicyclic bifunctional compound units noted above, more preferred are 1,4-cyclohexanedimethanol units and 1,4-cyclohexanedicarboxylic acid units, since they are easily available and since copolyesters comprising them and even moldings from such copolyesters could have higher drop-impact strength.

The aromatic bifunctional compound units may be any of aromatic dicarboxylic acid units, aromatic hydroxycarboxylic acid units and aromatic dial units. Their examples include divalent units to be derived from aromatic dicarboxylic acids except terephthalic acid and their ester-forming derivatives, such as isophthalic acid, phthalic acid, biphenyldicarboxylic acid, diphenyl ether-dicarboxylic acid, diphenyl sulfonedicarboxylic acid, diphenyl ketone-dicarboxylic acid, sodium sulfo-isophthalate, 2,6-naphthalenedicarboxylic acid, 1,4-naphthalenedicarboxylic acid, 2,7-naphthalenedicarboxylic acid, etc.; aromatic hydroxycarboxylic acids and their ester-forming derivatives, such as hydroxybenzoic acid, hydroxy toluic acid, hydroxynaphthoic acid, 3-(hydroxyphenyl) propionic acid, hydroxyphenylacetic acid, 3-hydroxy-3-phenylpropionic acid, etc.; aromatic dials such as bisphenol compounds, hydroquinone compounds, etc.

At least one of isophthalic acid units, phthalic acid units, naphthalenedicarboxylic acid units and 4,4'-biphenyldicarboxylic acid units are preferred as the aromatic dicarboxylic acid units for bifunctional compound units, since copolyesters comprising them are easy to produce and since the monomer costs for them are low.

In particular, isophthalic acid is advantageous in that the moldability of copolyesters comprising it is good and that the range of the molding conditions for obtaining good moldings from the copolyesters is broad while the percentage of failed moldings from them is low. In addition, the acid is further advantageous in that it retards the crystallization rate of the copolyesters comprising it to thereby prevent the moldings of the copolyesters from being whitened.

Naphthalenedicarboxylic acid is also advantageous in that it increases the glass transition point of copolyesters comprising it and even increases the heat resistance of containers comprising the copolyesters. In addition, naphthalenedicarboxylic acid-copolymerized polyesters absorb UV rays, and are therefore preferably used in producing containers that are desired to be resistant to UV rays.

For the purpose of protecting the contents of coinjection stretch blow molded containers from W rays, it is desirable that the thermoplastic polyester to be used for producing the containers has a naphthalenedicarboxylic acid component in an amount of from 0.1 to 15 mol %. More preferably from 1.0 to 10 mold, relative to the sum total of all dicarboxylic acid components constituting it. 2,6-naphthalenedicarboxylic acid component is preferred as naphthalenedicarboxylic acid, since copolyesters comprising it are easy to produce and since the monomer cost for it is low.

As examples of the aromatic bifunctional compound units, mentioned are dial units to be derived from 2,2-bis [4-(2hydroxyethoxy)phenyl]propane, 2-{4-[2-(2-hydroxyethoxy)ethoxy)phenyl}-2-[4-(2-hydroxyethoxy) phenyl]propane, 2,2bis{4-[2-(2-hydroxyethoxy)ethoxy] phenyl}propane, bis[4-(2hydroxyethoxy)phenyl]sulfone, {4-[(2-hydroxyethoxy)ethoxy]phenyl}-[4-(2-hydroxyethoxy)phenyl]sulfone, 1,1-bis[4-(2-hydroxyethoxy)phenyl]cyclohexane, 1-{4-[2-(2-hydroxyethoxy)ethoxy)ethoxy]phenyl}-1-[4-(2- hydroxyethoxy)phenyl]cyclohexane, 1,1-bis[4-[2-(2-hydroxyethoxy)ethoxy]phenyl}cyclohexane, 2,2-bis[4-(2-hydroxyethoxy)-2,3,5,6-tetrabromophenyl]propane, 1,4-bis(2-hydroxyethoxy)benzene, 1-(2-hydroxyethoxy)-4-[2-(2-hydroxyethoxy)ethoxy]benzene, 1,4-bis[2-(2-hydroxyethoxy)ethoxy]benzene, etc. Of those diol units, preferred are 2,2-bis[4-(2-hydroxyethoxy)phenyl]propane units, bis[4-(2-hydroxyethoxy)phenyl]sulfone units and 1,4-bis(2-hydroxyethoxy)benzene units, since polyester resins comprising any of those diol units are easy to produce while having good melt stability, end since moldings from such resins have good color tone and good impact resistance.

The polyester resin to be used for the layer a in the invention may have one or more bifunctional compound units of those mentioned hereinabove.

The polyester resin for the layer a in the invention may contain a small amount of diethylene glycol units from diethylene glycol, which is a dimer of an ethylene glycol component and is formed as a minor by-product in the process of producing the polyester resin. However, if the polyester resin for use in the invention contains a large amount of such diethylene glycol units, its glass transition point will lower to cause some problems in that the heat resistance of the resin is lowered and the resin is unfavorably colored. If so, the heat resistance, the mechanical strength and the color tone of moldings such as bottles and others to be produced from the polyester resin will be degraded. Therefore, it is desirable that the proportion of the diethylene glycol units in the polyester resin is minimized as much as possible. For these reasons, it is desirable that the proportion of the diethylene glycol units in the polyester resin for use in the invention is smaller than 3 mol %, more preferably at most 2 mol %, relative to the total mols of all constituent units of the polyester resin.

The polyester resin to be used for the layer a in the invention may be optionally copolymerized with any other polyfunctional compound units except terephthalic acid units and ethylene glycol units. Preferred polyfunctional compound units are derived from at least one polyfunctional compound having at least three groups selected from carboxyl groups, hydroxyl groups and their ester-forming groups. It is desirable that the proportion of the polyfunctional compound units to be in the polyester resin for use in the invention is at most 0.5 mol % relative to the total mols of all constituent units of the polyester.

The polyfunctional compound units are not specifically defined, provided that they are derived from polyfunctional compounds having at least three, same or different groups selected from carboxyl groups, hydroxyl groups and their ester-forming groups. The polyfunctional compounds from which the polyfunctional compound units are derived may be any of polyfunctional compounds having at least three carboxyl groups only, those having at feast three hydroxyl groups only, or those having at least three carboxyl and hydroxyl groups in total.

As preferred examples of the polyfunctional compound units, mentioned are those derived from aromatic polycarboxylic acids such as trimesic acid, trimellitic acid, 1,2,3 benzenetricarboxylic acid, pyromellitic acid, 1,4,5,8-naphthalenetetracarboxylic acid, etc.; aliphatic polycarboxylic acids such as 1,3,5-cyclohexanetricarboxylic acid, etc.; aromatic polyalcohols such as 1,3,5-trihydroxybenzene, etc.; aliphatic or alicyclic polyalcohols such as trimethylolpropane, pentaerythritol, glycerin, 1,3,5-cyclohexanetriol, etc.; aromatic hydroxycarboxylic acids such as 4-hydroxyisophthalic acid, 3-hydroxyisophthalic acid, 2,3-dihydroxybenzoic acid, 2,4-dihydroxybenzoic acid, 2,5-dihydroxybenzoic acid, 2,6-dihydroxybenzoic acid, protocatechuic acid, garlic acid, 2,4-dihydroxyphenylacetic acid, etc.; aliphatic hydroxycarboxylic acids such as tartaric acid, malic acid, etc.; and their ester-forming derivatives. The polyester resin for use as the layer a in the invention may contain only one or at least two polyfunctional compound units such as those mentioned above.

Of those mentioned above, the polyester resin for use as the layer a in the invention preferably contains at least one polyfunctional compound unit to be derived from trimellitic acid, pyromellitic acid, trimesic acid, trimethylolpropane and pentaerythritol, in view of the easiness in producing the polyesters and of the costs for their production.

In addition, the polyester resin for use as the layer a in the invention that optionally contains such polyfunctional compound units may further contain, as still other optional units, monofunctional compound units to be derived from at least one of monofunctional compounds such as monocarboxylic acids, monoalcohols, their ester-forming derivatives, etc.

In the polyester resin containing such monofunctional compound units, it is desirable that the proportion of the monofunctional compound units is at most 5 mol % (where the resin contains two or more different monofunctional compound units, the proportion indicates the total of all those units) relative to the total mols of all constituent units of the resin. This is because gelling of the resin that satisfies the requirement is retarded in many cases. More preferably, the proportion of the monofunctional compound units is at most 1 mol %. If the proportion of the monofunctional compound units is larger than 5 mol %, the polymerization rate in producing the polyester resin through melt polymerization or solid-phase polymerization will be low whereby the producibility of the polyester resin is unfavorably lowered.

In the polyester resin for use as the layer a in the invention, the monofunctional compound units function as blocking compound units to block the terminal groups of the molecular chain or the terminal groups of the branched chains in the polyester resin, whereby the polyester resin is prevented from being too much crosslinked and from being gelled. The monofunctional compound units are not specifically defined, but are preferably those derived from at least one of monocarboxylic acids, monoalcohols and their ester-forming derivatives.

As preferred examples of the monofunctional compound units, mentioned are the units derived from monofunctional compounds, for example, aromatic monocarboxylic acids such as benzoic acid, o-methoxybenzoic acid, m-methoxybenzoic acid, p-methoxybenzoic acid, o-methylbenzoic acid, m-methylbenzoic acid, p-methylbenzoic acid, 2,3-dimethylbenzoic acid, 2,4-dimethylbenzoic acid, 2,5-dimethylbenzoic acid, 2,6-dimethylbenzoic acid, 3,4-dimethylbenzoic acid, 3,5-dimethylbenzoic acid, 2,4,6-trimethylbenzoic acid, 2,4,6-trimethoxybenzoic acid, 3,4,5-trimethoxybenzoic acid, 1-naphthoic acid, 2-naphthoic acid, 2-biphenylcarboxylic acid, 1-naphthalenacetic acid, 2-naphthalenacetic acid, etc.; aliphatic monocarboxylic acids such as n-octanoic acid, n-nonanoic acid, myristic acid, pentadecanoic acid, stearic acid, oleic acid, lineolic acid, linolenic acid, etc.; ester-forming derivatives of those monocarboxylic acids; aromatic alcohols such as benzyl alcohol, 2,5-dimethylbenzyl alcohol, 2-phenethyl alcohol, phenol, 1-naphthol, 2-naphthol, etc.; aliphatic or alicyclic mono alcohols such as pentadecyl alcohol, stearyl alcohol, polyethylene glycol monoalkyl ethers, polypropylene glycol monoalkyl ethers, polytetramethylene glycol monoalkyl ethers, oleyl alcohol, cyclododecanol, etc. The polyester resin for use in the invention may contain only one or at least two monofunctional compound units such as those mentioned above.

Of the monofunctional compound units mentioned above, those to be derived from one or more monofunctional compounds selected from benzoic acid, 2,4,6-trimethoxybenzoic acid, 2-naphthoic acid, stearic acid and stearyl alcohol are preferred for the polyesters for use herein, in view of the easiness in producing the polyesters and of the costs for their production.

In view of its moldability, it is desirable that the thermoplastic polyester for use in the invention consists essentially of an ethylene terephthalate component and has a melting point TMa (° C.) that satisfies the following formula (14):

$$240 \leq TMa \leq 250 \tag{14}$$

If its melting point TMa is higher than 250° C., the crystallization rate of the polyester resin is too high, and the resin crystallizes too rapidly while it is molded through injection molding or blow molding under heat, thereby often resulting in that the stretch orientation of the molded resin is degraded and the shapability thereof is worsened. In that case, bottles comprising the resin will be often whitened. For these reasons, the range of the molding conditions for obtaining good moldings will be narrowed and the percentage of failed moldings will increase. More preferably, the melting point TMa is not higher than 248° C. On the other hand, if the melting point TMa is lower than 240° C., the heat resistance of multi-layered containers comprising the polyester resin will below. If so, in addition, since the crystallinity of the polyester resin is too much lowered, the stretch orientation thereof is degraded and the mechanical strength thereof is lowered. Moreover, since the solid-phase polymerization temperature for the resin having such a low melting point must be inevitably lowered, the reaction speed for the resin is lowered, thereby causing a problem of low producibility of the resin. More preferably, the melting point TMa is not lower than 242° C., most preferably not lower than 244° C.

In order to obtain the polyester resin having such a preferred melting point, a polyester resin consisting essentially of an ethylene terephthalate component may be copolymerized with a suitable amount of a comonomer component. Concretely, it is desirable that the thus-copolymerized polyester resin contains a comonomer component in an amount of from 1 to 6 mol %, relative to the total mols of all constituent units of the polyester. More preferably, the comonomer component content of the polyester resin falls between 1.5 and 5 mol %, most preferably between 2 and 4 mol %.

In consideration of the degree of copolymerization with diethylene glycol that may be produced as a by-product in the process of producing the resin. some other comonomers may be added to the resin so as to make the resin copolymerized with them within the range noted above. Such other comonomers are not specifically defined, for which any monomers mentioned above are usable. Above all, preferred are neopentyl glycol, cyclohexanedimethanol, cyclohexanedicarboxylic acid, isophthalic acid, and naphthalenedicarboxylic acid.

It is desirable that the polyester resin for use as the layer a in the invention has a glass transition point TGa of not lower than 60° C. For the purpose of preventing shrinkage of the moldings to be obtained herein, the glass transition point TGa of the resin is more desirably not lower than 70° C. If the polyester resin has a glass transition point TGa of lower than 60° C., the moldings comprising it, especially those molded through stretch blow molding will shrink after they are taken out of the mold end their appearance will be poor. The shrinkage of the moldings taken out of the mold will be caused by the relaxation of the residual stress thereof.

The polyester resin for use as the layer a in the invention may be produced in various methods such as those to be mentioned below.

One preferred example of the polyester resin for use as the layer a in the invention is a polyester consisting essentially of an ethylene terephthalate component, and this may be produced from a starting material consisting mainly of a dicarboxylic acid component that comprises terephthalic acid or its ester-forming derivative, a dial component that comprises ethylene glycol, and optional components of being a bifunctional compound component, a polyfunctional component and a monofunctional component such as those mentioned above.

In this, it is desirable that the molar ratio of (all dial components)/(all dicarboxylic acid components) is defined to fall between 1.1/1 and 2.5/1.

To produce the polyester resin for use as the layer a in the invention, the components of the starting material noted above are esterified or interesterified and thereafter polycondensed in melt. If desired, the polyester thus produced after the melt polycondensation may be further polymerized in a solid phase.

It is desirable that the esterification or interesterification for producing the polyester resin for use as the layer a in the invention is effected under a pressure of at most about 5 kg/cm² (as absolute pressure) or under normal pressure, at a temperature falling between 180 and 300° C., while water or alcohol being produced is evaporated away.

The esterification may be effected in the absence of a catalyst. However, the interesterification is effected preferably in the presence of an interesterification catalyst that may be at least one of calcium, manganese, magnesium, zinc, titanium, sodium and lithium compounds or the like. In particular, in view of the transparency of the resin to be produced, preferred are manganese, magnesium or titanium compounds as the catalyst.

After having been thus esterified or interesterified, the resulting prepolymer, to which are optionally added additives including a polycondensation catalyst, a coloration inhibitor and others, is then polycondensed in melt under a reduced pressure of at most 5 mmHg, at a temperature falling between 200 and 300° C., into a polyester having a desired viscosity. As the reactor for the melt polycondensation, employable are any of vertical batchwise polycondensation devices, continuous polycondensation devices comprising a horizontal, double screw rotary reactor, etc.

It is desirable that the polyester as obtained through the melt polycondensation has an intrinsic viscosity of from 0.40 to 0.90 dl/g, more preferably from 0.45 to 0.80 dl/g, in view of the easiness in handling the polyester. If the polyester as obtained through the melt polycondensation has an intrinsic viscosity of lower than 0.40 dl/g, its melt viscosity is too low when the polyester is taken out of the reactor. As a result, it is difficult to extrude the polyester in the form of strands or sheets, and in addition, it is also difficult to pelletize the polyester into uniform pellets. Moreover, a long period of time will be taken for increasing the molecular weight of the polyester, and this means the reduction in the producibility of the intended polyester. On the other hand, if the intrinsic viscosity of the polyester is higher than 0.90 dl/g, the melt viscosity thereof is too high. As a result, it is difficult to take out the polyester from the reactor, and, in addition, the polyester will be thermally deteriorated and unfavorably colored.

Where a polycondensation catalyst is used for the melt polycondensation, it may be any and every one that is generally used in ordinary polyester production. For example, it includes antimony compounds such as antimony trioxide, etc.; germanium compounds such as germanium dioxide, germanium tetraethoxide, germanium tetra-n-butoxide, etc.; titanium compounds such as tetramethoxytitanium, tetraethoxytitanium, tetra-n-propoxytitanium, tetraisopropoxytitanium, tetrabutoxytitanium, etc.; tin compounds such as di-n-butyltin dilaurate, di-n-butyltin oxide, dibutyltin diacetate, etc. These catalyst compounds may be used either singly or as combined. Of those polymerization catalysts, preferred are germanium compounds, since the polyester to be produced could have good color tone. In view of their cost, however, preferred are antimony compounds. Of the germanium compounds, especially preferred is germanium dioxide; and of the antimony compounds, especially preferred is antimony trioxide. The amount of the polycondensation catalyst, if used, is preferably from 0.002 to 0.8% by weight relative to the weight of the dicarboxylic acid component.

In view of the moldability of the polyester to tee produced, germanium compounds are preferred to antimony compounds. This is because, since the crystallization rate of the polyester as produced through polymerization using an antimony compound is generally higher than that as produced through polymerization using a germanium compound, the former polyester will crystallize more rapidly than the latter one when it is heated for injection molding or blowmolding. As a result, the stretch orientation of the moldings of the former polyester is degraded and the shapability thereof is worsened. Specifically, bottles of the moldings will be whitened. After all, the range of the molding conditions for obtaining good moldings from the polyester is narrowed, and the percentage of failed moldings from it will increase.

Therefore, for polyethylene terephthalate not containing any comonomer component except the by-product of diethylene glycol, selecting a specific catalyst is important, since the crystallization rate of the polyethylene terephthalate of that type is higher than that of other polyethylene terephthalates es modified with a small amount of any other comonomer component. For the polyethylene terephthalate of that type, therefore, germanium compounds are preferably used as the catalyst.

Where a coloration inhibitor is used in the polycondensation, it may be a phosphorus compound, including, for example, phosphorous acid, phosphoric acid, trimethyl phosphite, triphenyl phosphite, tridecyl phosphite, trimethyl phosphate, tridecyl phosphate, triphenyl phosphate, etc. The phosphorus compounds may be used either singly or as combined. Where a coloration inhibitor of any of the phosphorus compounds noted above is used, its amount is preferably from 0.001 to 0.5% by weight relative to the weight of the dicarboxylic acid component.

In order to prevent the polyester from being pyrolyzed and yellowed, a cobalt compound such as cobalt acetate or the like may be added thereto in an amount of from 0.001 to 0.5% by weight, preferably from 0.05 to 0.3% by weight, relative to the weight of the dicarboxylic acid component.

In the process of producing the polyester, diethylene glycol is formed as a by-product. However, if the polyester contains a large amount of diethylene glycol units, its glass transition point will lower whereby its heat resistance is lowered and the polyester is colored. As a result, the heat resistance, the mechanical strength and the color tone of moldings to be produced from the polyester will be degraded. In order to evade these problems, it is desirable to effect the esterification, the interesterification and/or the melt polycondensation in the presence of a diethylene glycol production retardant, in an amount of from 0.001 to 0.5% by weight relative to the weighs of the dicarboxylic acid component, which may be selected from tetraelkylammonium hydroxides such as tetraethylammonium hydroxide, etc.; organic amines such as triethanolamine, triethylamine, etc. Using the diethylene glycol production retardant could lower the proportion of diethylene glycol units that may be in the polyester resin.

The polyester thus obtained as a result of the melt polycondensation is extruded in the form of strands, sheets or the like, then cooled and pelletized with a strand cutter, a sheet cutter or the like into pellets of various shapes, for example, columnar, oval columnar, spherical, disk-like or dice-like pellets, etc. For cooling the polyester being taken out of the reactor, employable is any cooling method of, for example, a water cooling method in a water tank, a cooling method with a drum, an air cooling method, etc.

It is desirable that the polyester thus obtained is crystallized by drying it under heat at a temperature falling between 120° C. and 180° C., and then molded or subjected to the next solid-phase polymerization. Preferably, the quantity of heat for crystal fusion of the thus-crystallized polyester resin is at least 10 J/g, more preferably at least 20 J/g. If the quantity of heat for crystal fusion of the crystallized polyester resin is smeller then 10 J/g, the pellets of the resin will be glutinous and gel during the solid-phase polymerization or while they are dried prior to being molded.

If desired, the polyester produced in the manner mentioned above may be subjected to solid-phase polymerization so as to increase its degree of polymerization, prior to being used as the polyester resin in the invention. The solid-phase polymerization reduces the oligomers and acetaldehyde remaining in the resin, and the resulting resin is prevented from soiling the mold used for molding it. In addition, the taste, flavor and other properties of the contents of the containers comprising the thus solid-phase polymerized resin are prevented from being deteriorated. The solid-phase polymerization of the polyester is preferably effected in vacuum, or under reduced pressure, or in an inert gas such as nitrogen gas or the like. In order to prevent the polyester pellets from gelling together during their solid-phase polymerization, it is also desirable that the pellets are moved all the time during their solid-phase polymerization, according to a rolling method, a gaseous fluidized-bed method or the like. The solid-phase polymerization is effected preferably at a temperature falling between 180 and 270° C., more preferably between 190 and 240° C. Regarding the temperature for the solid-phase polymerization, it is desirable that the temperature falls within the defined range and is higher by at least 15° C., more preferably at least 20° C., than the melting point of the final polyester (this is the polyester as intended to be finally obtained for direct use in the invention). In view of the producibility and other factors, it is desirable that the solid-phase polymerization time falls generally between around 5 and 40 hours or so.

EVOH to be used for the ethylene-vinyl alcohol copolymer layer (layer b) in the invention is prepared by saponifying a copolyester of ethylene and a vinyl ester, with an alkali catalyst or the like.

One typical example of the vinyl ester is vinyl acetate, which, however, is not limitative. Any other vinyl esters of fatty acids (e.g., vinyl propionate, vinyl pivalate, etc.) are employable herein.

The ethylene content ETb of EVOH for use in the invention falls between 25 and 48 mol %. If the ethylene content ETb is smaller than 25 mol %, the gas barrier properties of the film of EVOH in a high humidity condition will be poor, and, in addition, the melt moldability of EVOH will be poor. For its lowermost limit, ETb is preferably at least 30 mol %, more preferably at least 35 mol %. On the other hand, however, if the ethylene content ETb is larger than 48 mol %, the film of EVOH could not have good gas barrier properties. For its uppermost limit, ETb is preferably at most 45 mol %, more preferably at most 40 mol %.

The degree of saponification SDb of the vinylester moiety of EVOH for use in the invention is at least 92%, preferably at least 94%, more preferably at least 96%. If the degree of saponification SDb is smaller than 92%, the gas barrier properties of the film of EVOH in a high humidity condition will be poor. If so, in addition, the thermal stability of EVOH is poor, and the moldings from EVOH often have gelled aggregates and fish eyes. The degree of saponification SD bis at most 99%, but preferably at most 98%, more preferably at most 97.5%. If SDb is higher than 99%, the effect of EVOH to improve the delamination resistance of layered moldings comprising EVOH will be poor.

Where EVOH for use in the invention is in the form of a mixture of two or more different EVOHs each having a different ethylene content or a different degree of saponification, the mean values shall be calculated from the proportions by weight of the plural EVOHs for the ethylene content and the degree of saponification of the EVOH mixture.

For ensuring its good delamination resistance end good gas barrier properties, it is desirable that EVOH is a mixture of two different EVOH (b1 and b2) each having a different ethylene content or a different degree of saponification. In the EVOH mixture, it is also desirable that the ratio by weight of b1 to b2 falls between 10/90 and 90/10 and satisfies the following formulae (6) to (11):

$$25 \leq ETb1 \leq 48 \quad (6)$$

$$99 \leq SDb1 \quad (7)$$

$$25 \leq ETb2 \leq 48 \quad (8)$$

$$92 \leq SDb2 \leq 99 \quad (9)$$

$$|ETb2-ETb1| \leq 8 \quad (10)$$

$$1 \leq (SDb1-SDb2) \leq 8 \quad (11)$$

wherein;

ETb1 indicates the ethylene content (mol %) of the ethylene-vinyl alcohol copolymer (b1), SDb1 indicates the degree of saponification (%) of the ethylene-vinyl alcohol copolymer (b1), ETb2 indicates the ethylene content (mol %) of the ethylene-vinyl alcohol copolymer (b2), and SDb2 indicates the degree of saponification (%) of the ethylene-vinyl alcohol copolymer (b2). In the mixture of two EVOHs (b1, b2), the ratio by weight of b1 to b2, b1/b2, preferably falls between 10/90 and 90/10. If the ratio by weight of b1/b2 is smaller than 10/90, the mixture of such two EVOHs could poorly exhibit its effect of improving the gas barrier properties of the EVOH layer. On the other hand, if the ratio, b1/b2, is larger than 90/10, the laminate of the layers a and b will be often delaminated. For improving the delamination resistance and the gas barrier properties of the EVOH layer, the ratio of b1/b2 is to more preferably fall between 20/80 and 80/20, even more preferably between 30/70 and 70/30.

Preferably, the ethylene content ETb1 of EVOH (b1) falls between 25 and 48 mol %. If the ethylene consent ETb1 is smaller than 25 mol %, the gas barrier properties of the EVOH layer in a high humidity condition will lower, and the melt moldability of EVOH will be poor. More preferably, ETb1 at least 28 mol %, even more preferably at least 30 mol %. If, however, the ethylene content ETb1 is larger than 48 mol %, the EVOH layer could not have good gas barrier properties. Preferably, ETb1 is at most 45 mol %, more preferably at most 40 mol %.

The degrees of saponification SDb1 of the vinylester moiety of EVOH (b1) is at least 99%, but preferably at least 99.3%, more preferably at least 99.5%. If the degree of saponification SDb1 is smaller than 99 mol %, the gas barrier properties of the EVOH layer will be poor, and especially those in a high humidity condition are bad.

The ethylene content ETb2 of EVOH (b2) falls between 25 and 48 mol %. If the ethylene content ETb2 is smaller than 25 mol %, the gas barrier properties of the EVOH layer in a high humidity condition will lower, end the melt moldability of EVOH will be poor. Preferably, ETb2 is at least 30 mol %, more preferably at least 35 mol %. If, however, the ethylene content ETb2 is larger than 48 mol %, the EVOH layer could not have good gas barrier properties. Preferably, ETb2 is at most 45 mol %, more preferably at most 40 mol %.

The degree of saponification SDb 20f the vinylester moiety of EVOH (b2) is at least 92%, but preferably at least 94%, more preferably at least 96%. If the degree of saponification SDb2 is smaller than 92 mol %, the gas barrier properties of the EVOH layer will be poor in a high humidity condition. If so, in addition, the thermal stability of EVOH is poor, and the moldings from the EVOH mixture often have gelled aggregates and fish eyes. The degree of saponification SDb2 is at most 99%, but preferably at most 98%, more preferably at most 97.5%. If SDb2 is higher than 99%, the delamination resistance of the EVOH layer will be poor.

Where two EVOHs (b1, b2) are mixed to give an EVOH mixture capable of being formed into films having better gas barrier properties, it is desirable that the difference in the ethylene content between the two, b1 and b2, is at most 8 mol %. If the ethylene content difference is larger than 8 mol %, the transparency of the EVOH layer will lower. If so, in addition, the laminate of the layers 3 and k will be often delaminated. For the purpose of increasing the transparency of the EVOH layer and of preventing the delamination between the layers a and b, it is more desirable that the ethylene content difference between b1 and b2 is at most 4 mol %, even more desirably at most 2 mol %.

In the EVOH mixture of two EVOHs (b1, b2), it is also desirable that the difference in the degree of saponification between the two, b1 and b2, falls between 1 and 8%. If the difference in the degree of saponification therebetween is smaller than 1%, the delamination resistance of the EVOH layer will be poor. If, however, the difference is larger than 8%, the gas barrier properties of the EVOH layer will be poor in a high humidity condition. If so, in addition, the thermal stability of the EVOH mixture is poor, and the moldings from the EVOH mixture often have gelled aggregates and fish eyes. For ensuring good delamination resistance, good gas barrier properties and good thermal stability of the EVOH mixture, the difference in the degree of saponification between b1 and b2 falls more preferably between 1.5% and 5%, even more preferably between 2% and 4%.

Where such two EVOHs (b1, b2) each having a different ethylene content or a different degree of saponification are mixed to give an EVOH mixture having better gas barrier properties, it is desirable that the mean value of the ethylene contents of the two, b1 and b2, to be calculated from the ratio by weight of those two falls between 25 and 48 mol %. If the mean ethylene content is smaller than 25 mol %, the gas barrier properties of the EVOH layer in a high humidity condition will be poor, and, in addition, the melt moldability of the EVOH mixture will also be poor. More preferably, the mean ethylene content is at least 30 mol %, even more preferably at least 35 mol %. If, however, the mean ethylene content is larger than 48 mol %, the EVOH layer could not have good gas barrier properties. More preferably, the mean ethylene content is at most 45 mol %, even more preferably at most 40 mol %.

It is desirable that the EVOH mixture has a mean degree of saponification to be calculated from the ratio by weight of the two, b1 to b2, of being at least 94%, more preferably at least 96%, even more preferably at least 97%. If the mean degree of saponification is lower than 94%, the gas barrier properties in a high humidity condition of the EVOH layer will be poor. If so, in addition, the thermal stability of the EVOH mixture will also be poor, and the moldings from the EVOH mixture will often have gelled aggregates and fish eyes. Also preferably, the mean degree of saponification is at most 99%, more preferably at most 98.5%. If the mean degree of saponification is higher than 99%, the delamination resistance of the EVOH layer will be poor.

Three or more different EVOHs may be blended to form EVOH mixtures for use in the invention. In such EVOH mixtures, two of plural EVOHs shall be blended in a ratio by weight falling between 10/90 and 90/10 and shall satisfy the above-mentioned formulae (6) to (11).

The ethylene content of EVOH and the degree of saponification thereof as referred to herein are obtained through nuclear magnetic resonance (NMR).

EVOH for use in the invention may be copolymerized with a small amount of any other comonomers within the range not interfering with the object of the invention. Examples of the comonomers employable herein include a-olefins such as propylene, 1-butene, isobutene, 4-methyl-1-pentene, 1-hexene, 1-octene, etc.; unsaturated carboxylic acids such as itaconid acid, methacrylic acid, acrylic acid, maleic anhydride, etc., their salts, partial or complete esters, nitriles, amides and anhydrides; vinylsilane compounds such as vinyltrimethoxysilane, etc.; unsaturated sulfonic acids and their salts; alkylthiols; vinylpyrrolidones, etc.

In particular, EVOH as copolymerized with from 0.0002 to 0.2 mol % of a vinylsilane compound is preferred as its compatibility with a coinjecting substrate resin with respect to the melt viscosity is improved, thereby enabling to obtain homogeneous coinjection moldings. The vinylsilane compound includes, for example, vinyltrimethoxysilane, vinyltriethoxysilane, vinyltri(β-methoxy-ethoxy)silane, γ-methacryloxypropylmethoxysilane, etc. Of those, preferred are vinyltrimethoxysilane and vinyltriethoxysilane.

For obtaining homogeneous coinjection moldings, the amount of the comonomer, vinylsilane compound to be copolymerized with EVOH is preferably between 0.001 and 0.15 mol %, more preferably between 0.005 and 0.1 mol %.

EVOH containing a boron compound also has good melt viscosity, and has the advantageous of giving homogeneous coinjection moldings. The boron compound includes, for example, boric acids, berates, salts of boric acids, boron hydrides, etc. Concretely, the boric acid include boric acid, orthoboric acid, metaboric acid, tetraboric acid, etc.; the berates include triethyl borate, trimethyl borate, etc.; the salts of boric acids include alkali metal salts and alkaline earth metal salts of various boric acids such es those mentioned above, as well as borax, etc. Of those compounds, preferred are boric acid, orthoboric acid, and $NaBH_4$.

The boron compound content of EVOH may fall between 20 and 2,000 ppm, but preferably between 50 and 1,000 ppm, more preferably between 100 and 500 ppm, in terms of the boron element. Containing the boron compound within the defined range, EVOH could be prevented from suffering from torque variation while it is in melt under treat. However, if the boron compound content is smaller than 20 ppm, the effect of the boron compound added will be poor. If, on the other hand, the boron compound content is larger than 2,000 ppm, EVOH will easily gel and could not be molded well.

Also preferably, EVOH for use in the invention may contain an alkali metal salt in an amount of from 5 to 5,000 ppm in terms of the alkali metal element. The alkali metal salt added is effective for improving the interlayer adhesiveness of EVOH and for improving the compatibility thereof.

More preferably, the amount of the alkali metal salt to be added falls between 20 and 1,000 ppm, even more preferably between 30 and 500 ppm, in terms of the alkali metal element. The alkali metal includes, for example, lithium, sodium, potassium, etc., and the alkali metal salt may be any of salts with monovalent metals of aliphatic carboxylic acids, aromatic carboxylic acids, phosphoric acids, metal complexes, etc. For example, the salt includes sodium acetate, potassium acetate, sodium phosphate, lithium phosphate, sodium stearate, potassium stearate, sodium ethylene diamine tetra-acetate, etc. Of those, preferred are sodium acetate, potassium acetate and sodium phosphate.

Still preferably, EVOH for use in the invention may contain a phosphorus compound in an amount of from 2 to 200 ppm, more preferably from 3 to 150 ppm, even more preferably in an amount of from 5 to 100 ppm, in terms of the phosphorus element. If the phosphorus content of EVOH is smaller than 2 ppm, or larger than 200 ppm, the melt moldability and the thermal stability of EVOH will become poor. In particular, when melt molding of EVOH takes a long period of time, there will occur some problems with the resulting moldings in that gelled fish eyes are formed in the moldings and the moldings may be unfavorably colored.

The type of the phosphorus compound to be added to EVOH is not specifically defined. For example, employable are various acids such as phosphoric acid, phosphorous acid and others, and even their salts, etc. Phosphates, if used, may be in EVOH in any form of primary phosphates, secondary phosphates and tertiary phosphates, and the type of cations for them is not also specifically defined. However, the salts are preferably alkali metal salts and alkaline earth metal salts. Especially preferably, the phosphorus compound is added to EVOH in the form of sodium dihydrogenphosphate, potassium dihydrogenphosphate, disodiumhydrogenphosphate, ordipotassium hydrogenphosphate.

Within the range not interfering with the object of the invention, any of thermal stabilizers, UV absorbents, antioxidants, colorants, fillers end other resins (polyamides, polyolefins, etc.) may be blended with the EVOH resin for use in the invention. In the invention, it is important that EVOH to be used gives, in its differential scanning calorimetry (DSC), a single peak for crystal fusion. The single peak for crystal fusion of EVOH is meant to indicate that the DSC chart of EVOH gives only one largest value or smallest value for crystal fusion, and this does not apply to any other cases where the largest or smallest value is accompanied by some other maximum values or minimum values. However, in the case where none of maximum or minimum values attendant on the largest of smallest value is seen but an inflection point (so-called shoulder peak) is seen, the peak for crystal fusion shall be considered as a single peak. If its DSC could not give a single peak for crystal fusion, the EVOH layer could not have good transparency, and its delamination resistance is poor.

In the invention, it is also important that the melting point TMb of EVOH to be used falls between 140° C. and 190° C. If its melting point TMb is lower than 140° C., the EVOH layer could not have good gas barrier properties. Preferably, the TMb is not lower than 145° C., more preferably not lower than 150° C. On the other hand, however, if the melting point TMb is higher then 190° C., the delamination of the EVOH layer formed in multilayered containers will much increase. Preferably, TMb is not higher than 185° C., more preferably not higher than 180° C.

EVOH having a melting point that falls within the defined range can be prepared by controlling its ethylene content and its degree of saponification both to fall within specific ranges.

Preferably, EVOH for use in the invention has a melt index (MIb, at 190° C. under a load of 2,160 g, as measured according to JIS K7210) falling between 0.1 and 10 g/10 min. If MIb is lower than 0.1 g/10 min. The fluidity of EVOH in melt molding will be poor, thereby resulting in that the injection load for EVOH increases to interfere with rapid continuous operation.

If so, in addition, the resulting moldings will have gelled aggregates and fish eyes. Moreover, multi-layered containers of the moldings will have weld lines of resin flow spots, by which their appearance is much degraded. MIb is more preferably at least 0.5 g/10 min. On the other hand, however, if MIb is larger than 10 g/10 min, the drop impact strength of the layer b in the resulting multi-layered containers will lower, and the gas barrier properties of the dropped containers will become poor. In addition, in molding machines where a large number of moldings are produced all at a time, the amount of EVOH to be injected into each mold could not be stabilized and homogeneous molding will be difficult. To make matters worse, the thickness distribution in the axial direction of EVOH in the multilayer-injected parison could not be uniform, and, in addition, even the thickness distribution in the direction vertical to the axis of EVOH is also not uniform in such a manner the thickness of the EVOH layer is larger in the lip area of the parison while that of the EVOH layer is smaller in the body area thereof. As a result, the gas barrier properties of the resulting multi-layered containers from the parison are not good, and, in addition, the appearance thereof is not also good since the lip area thereof is unfavorably whitened. More preferably, MIb is at most 8 g/10 min, even more preferably at most 6 g/10 min.

Methods for producing the multi-layered containers of the invention are mentioned below.

A multi-layered container precursor (parison) is formed generally in a molding machine equipped with two injection cylinders. In the molding machine of that type, the single mold is once clamped, and thereafter a molten PES resin and a molted EVOH resin are coinjected thereinto from the separate injection cylinders for the two not synchronized for their injection timing, both through alternate and/or concentric nozzles. The coinjection in that manner gives the intended multi-layered parison. Concretely, for example, (1) PES for the inner and outer layers is first injected, and then EVOH for the interlayer is injected to give a three-layered container parison of PES/EVOH/PES; or (2) PES for the inner and outer layers is first injected, then EVOH is injected while, at the same time or after the EVOH injection, PES to be the core layer is again injected to give a five-layered container parison of PES/EVOH/PES/EVOH/PES. Anyhow, for producing the parisons of the invention, employable are any ordinary methods for producing ordinary bottomed parisons in which the interlayer is completely sealed with the inner and outer PES layers. Therefore, the parison production in the invention does not require any special equipment.

Regarding the condition for injection molding to give the bottomed parisons, it is desirable that PES is injected at a temperature falling between 250° C. and 330° C., more preferably between 270° C. and 320° C., even more preferably between 280° C. and 310° C. If the injection temperature for PES is lower than 250° C., the PES pellets could not be well melted and the resulting moldings will have fish eyes of the non-molten PES pellets, by which their appearance is worsened. In addition, the non-molten PES pellets existing in the moldings will lower the mechanical strength of the moldings. In some extreme cases, the screw torque for the PES injection will much increase whereby the molding machine will have operation trouble. On the other hand, however, if the injection temperature for PES is higher than 330° C., PES will be much degraded to have a lowered molecular weight, whereby the mechanical strength of the resulting moldings will be lowered. In addition, the PES degradation at such high temperatures gives some vapors of acetaldehyde and the like, by which the properties of the contents to be filled in the molded containers will be worsened. Moreover, the oligomers resulting from the PES degradation will greatly soil the mold, and the moldings as molded in the mold thus soiled with such oligomers will have bad appearance.

For EVOH, it is desirable that it is injected at a temperature falling between 170° C. and 250° C., more preferably between 180° C. and 240° C., even more preferably between 190° C. and 230° C. If the injection temperature for EVOH is lower than 170° C., the EVOH pellets could not be well melted and the resulting moldings will have fish eyes of the non-molten EVOH pellets, by which their appearance is worsened. In some extreme cases, the screw torque for the EVOH injection will much increase whereby the molding machine will have operation trouble. On the other hand, however, if the injection temperature for EVOH is higher than 250° C., EVOH will be much degraded or gelled, whereby the appearance of the resulting moldings will be poor and the moldings will be unfavorably colored. In addition, the EVOH flow being injected will be disordered by the vapors formed through the EVOH degradation and by the gels of EVOH, whereby the EVOH layer formed will have failed parts and the barrier properties of the layer will be lowered. In some extreme case, the EVOH gels will make it impossible to continue the injection molding operation.

It is desirable that the temperature of the hot runner parts through which PES and EVOH run to be injected into the mold falls between 220° C. and 300° C., more preferably between 240° C. and 280° C., even more preferably between 250° C. and 270° C. If the temperature of the hot runner parts is lower than 220° C., PES will crystallize and solidify in the part. If so, the molding operation will become difficult. On the other hand, however, if the temperature of the hot runner parts is higher than 300° C., EVOH will be much degraded or gelled, whereby the appearance of the resulting moldings will be poor and the moldings will be unfavorably colored. In addition, the EVOH flow being injected will be disordered by the vapors formed through the EVOH degradation end by the gels of EVOH, whereby the EVOH layer formed will have failed parts and the barrier properties of the layer will be lowered. In some extreme case, the EVOH gels will make it impossible to continue the injection molding operation.

In order to ensure good delamination resistance of the multi-layered containers to be obtained from the bottomed parisons through stretch blowing, it is important that the crystallization of PES and EVOH is minimized es much as possible in the injection molding stage for preparing the parisons. In that condition, the parisons could be uniformly stretched into good containers having good delamination resistance, high transparency and good shape retentivity. To retard the crystallization of PES and EVOH in the parisons, it is desirable that the mold temperature is defined to fall between 0° C. and 70° C., more preferably between 5° C. and 50° C., even more preferably between 10° C. and 30° C. If the mold temperature is lower than 0° C., the dew formed around the mold will worsen the appearance of the parisons, from which good moldings could not tee obtained. On the other hand, if the mold temperature is higher than 70° C., the crystallization of PES and EVOH in the parisons will be promoted. As a result, the parisons could not be uniformly stretched, and the delamination resistance of the moldings to be obtained from them through stretch blow molding will be low. In addition, it is difficult to obtain moldings of the intended shape. Moreover, the PES crystallization lowers the transparency of the moldings.

Regarding the thickness of the parison, its total thickness is preferably between 2 and 5 mm, and the thickness of the EVOH layers is preferably between 10 and 500 $\mu$m in total.

The thus-prepared, multi-layered parison is directly or after having been re-heated with a heating means such as a block heater, an IR heater or the like, transferred into the next stretch-blowing step, in which it is stretched one-to-five-fold in the machine direction, and thereafter blown one-to-four-fold with compressed air into a multi-layered, stretch-blown polyester container with the EVOH resin layer teeing monoaxially or biaxially oriented.

In this step, if the temperature at which the multi-layered parison is heated is too high, the polyester will easily crystallize whereby the stretch-brown container is whitened end its appearance becomes poor. If so, in addition, the delamination of the stretch-blown container will increase unfavorably. On the other hand, if the temperature at which the multi-layered parison is heated is too low, the polyester will be crazed to be pearly whereby the transparency of the resulting stretch-blown container will be lowered. For these reasons, the temperature of the multi-layered parison being heated preferably falls between 85° C. and 140° C., more preferably between 90° C. and 130° C., even more preferably between 95° C. and 120° C.

The total thickness of the body part of the multi-layered container of the invention generally falls between 100 $\mu$m and 3 mm, and may vary depending on the use of the container. In that part of the container, the total thickness of the EVOH layers is preferably between 2 and 200 $\mu$m, more preferably between 5 and 100 $\mu$m.

It is desirable that the intrinsic viscosity IVa of the polyester resin for the layer a of the multi-layered container of the invention falls between 0.60 and 0.90 dl/g, in view of the mechanical strength, the appearance and even the producibility of the moldings. If the intrinsic viscosity IVa is smaller than 0.60 dl/g, the mechanical strength of the moldings will be low and, in addition, the polyester resin will much crystallize while heated in the step of parison molding or in the subsequent step of blow molding. As a result, the stretch orientation of the moldings will be degraded or the parison will fail to be well stretched, and, after all, the transparency of bottles of the moldings will be low. More preferably, IVa is at least 0.65 dl/g, even more preferably at least 0.70 dl/g. On the other hand, however, if the intrinsic viscosity IVa is higher than 0.90 dl/g, the melt viscosity of the polyester resin will be too high and the resin could not tee molded through injection into parisons. Moreover, while the parisons are stretch-blown, the resin therein will be unevenly stretched to significantly worsen the appearance of the resulting moldings. Anyhow, the polyester resin of which the intrinsic viscosity IVa falls outside the defined range causes such various molding failures. More preferably, IVa is at most 0.85 dl/g.

The intrinsic viscosity IVa noted above is of the polyester that forms the layer a of the multi-layered container of the invention. Therefore, in consideration of the fact that the intrinsic viscosity of the polyester having been formed into the layer 3 through melt molding shall lower in some degree, it is desirable that the intrinsic viscosity of the starting polyester chips for the layer a is larger than the defined range in some degree.

The terminal carboxyl concentration Ca of the polyester resin for the layer a of the multi-layered container of the invention is desirably at most 40 microequivalents/g in order that the polyester resin itself could have good melt stability and good coloration resistance and that the surfaces of the extruded moldings comprising the resin could be well prevented from being roughened. More desirably, Ca is at most 30 microequivalents/g. If its terminal carboxyl concentration Ca is larger than 40 microequivalents/g, the polyester resin will have poor thermal stability, when melted, and will be much degraded to have a greatly lowered molecular weight. If so, in addition, the moldings comprising the resin will be greatly colored.

The terminal carboxyl concentration Ca noted above is of the polyester that forms the layer a of the multi-layered container of the invention. Therefore, in consideration of the fact that the terminal carboxyl concentration of the polyester having been formed into the layer a through melt molding shall increase in some degree, it is desirable that the terminal carboxyl concentration of the starting polyester chips for the layer a is smaller than the defined range in some degree.

It is desirable that the oligomer(ethylene terephthalate cyclic trimer) content CTa of the polyester resin for the layer 3 of the multi-layered container of the invention is at most 2% by weight. When the polyester resin having such a low oligomer content is molded, few oligomers will adhere to the mold to soil them, by which, therefore, the appearance of the moldings comprising the resin is degraded little. In addition, in that condition, the step of clearing the mold and other parts of the molding machine used could be omitted, and the producibility of the moldings is high. For the purpose of well protecting the mold from being soiled by the oligomers, the oligomer content CTa is more preferably at most 1.5% by weight, even more preferably at most 1.0% by weight.

The oligomer content CTa noted above is of the polyester that forms the layer a of the multi-layered container of the invention. Therefore, in consideration of the fact that the oligomer content of the polyester having been formed into the layer a through melt molding shall increase in some degree, it is desirable that the oligomer consent of the starling polyester chips for the layer a is smaller than the defined range in some degree.

It is desirable that the thermoplastic polyester layer constituting the body of the multi-layered container of the invention has a density Da (g/cm³) that satisfies the following formula (12):

$$1.35 \leq Da \leq 1.37 \tag{12}$$

If the density Da of the thermoplastic polyester layer is smaller than 1.35 g/cm³, the layer will be stretched insufficiently and its mechanical strength will be low. If so, in addition, the layer will be greatly shrunk when the container comprising it is treated for hot filling or sterilization. More preferably, Da is at least 1.353 g/cm³, even more preferably at least 1.355 g/cm³. On the other hand, however, if Da is higher than 1.37 g/cm³, the delamination of the multi-layered container comprising the layer will increase. More preferably, Da is at most 1.367 g/cm³, even more preferably at most 1.365 g/cm³.

It is desirable that EVOH for the layer b of the multi-layered container of the invention has a density Db of falling between 1.11 dl/g and 1.20 dl/g. If the density Db is smaller than 1.11 dl/g, the layer b of EVOH could not have good gas barrier properties. More preferably, Db is at least 1.12 dl/g, even more preferably at least 1.13 dl/g. On the other hand, however, if the density Db is larger than 1.20 dl/g, the delamination of the multi-layered container comprising the layer of EVOH will increase. More preferably, Db is at most 1.19 dl/g, even more preferably at most 1.18 dl/g.

It is desirable that the internal haze of the body of the multi-layered container of the invention, which is measured according to the method mentioned below, is at most 5%. If the internal haze is larger than 5%, the appearance of the multi-layered container is not good. More preferably, the internal haze is at most 4%, even more preferably at most 3%.

Further surprisingly, we, the inventors have found that the molecular structure of the surface of the EVOH layer at the interface between the polyester layer (layer a) and the EVOH layer(layer b) constituting the multi-layered container of the invention has a significant influence on the delamination at the interface between those layers. Specifically, the presence of a large amount of ester groups in the surface of the layer b at the interface between the layers a and b significantly retards the delamination between those layers.

Concretely in the multi-layered container of the invention that comprises a thermoplastic polyester layer (layer a) and an ethylene-vinyl alcohol copolymer layer (layer b) with the layer a being kept in direct contact with the both surfaces of the layer b, it is important that the X-ray photoelectron spectroscopy (XPS) of the surface of the layer b as exposed by peeling the layers a and b of the body of the container at their interface shall give a pattern that satisfies the following formula (3):

$$0.015 \leq PC/(PA+PB+PC) \leq 0.3 \tag{3}$$

wherein PA indicates the area of the highest peak (peak A) of the peaks for the binding energy of C1s electrons, PB indicates the area of the peak (peak B) appearing in the side higher by from 1.1 to 1.8 eV than the position of the peak A, and PC indicates the area of the peak (peak C) appearing in the side higher by from 3.6 to 4.3 eV than the position of the peak A.

In the XPS pattern of the surface of the layer b at the interface between the layers a and b, the peak B that appears in the side higher by from 1.1 to 1.8 eV than the position of the highest peak (peak A) of all peaks for the binding energy of C1s electrons is assigned to the carbon atoms of the main chain to which an oxygen atom is directly bonded, or that is, to the carbon atoms of the main chain to which a hydroxyl group or an acetoxy group is bonded via its oxygen atom; the peak C that appears in the side higher by from 3.6 to 4.3 eV than the position of the peak A is assigned to the carbon atoms of the ester groups in the polymer; and the peak A is assigned to the other carbon atoms constituting the polymer.

Therefore, the peak area (PA, PB and PC) corresponding to each peek shall indicate the relative amount of the carbon atoms to which each peak is assigned, and the formula (3) is to define the proportion of the carbon atoms derived from the ester groups, relative to all carbon atoms, in the surface of the layer b at the interface between the layers a and b at which the layers have been peeled. The peak area (PA, PB and PC) corresponding to each peak is calculated according to the method described in the Examples to be mentioned hereinunder.

If the value of the formula (3) is smaller than 0.015, the delamination between the layers a and b will be great. On the other hand, however, if the value of the formula (3) is larger than 0.3, the gas barrier properties of the multi-layered container comprising the layers a and b will be poor. In order that the container could have better gas barrier properties, the value is preferably at most 0.25, more preferably at most 0.2.

For example, the EVOH resin used in Example 1 has an ethylene content of 44 mol % and a degree of saponification of 97%. Therefore, in order that the layer of the EVOH resin could be entirely homogeneous therein, the calculated proportion of the carbon atoms derived from the ester groups, relative to all carbon atoms constituting the resin, is to be 0.008. In fact, however, it is known that, in the coinjection stretch blow molded container as obtained in Example 1, the proportion of the ester groups remaining in the surface of the EVOH layer as exposed by peeling the EVOH layer and the polyester layer at their interface is 0.023. This means that the concentration of the ester groups was concentrated about 4-fold in the surface of the EVOH layer in Example 1.

The reason why the ester groups are locally concentrated in the surface of the EVOH layer is not completely clarified as yet, but it is believed that, while the melt of EVOH is injected and molded with being kept in direct contact with a polyester, the ester groups of EVOH having high affinity for the polyester will be concentrated in the surface of the resulting EVOH layer. As a result, it is believed that functional groups having high affinity for the polyester could be concentrated in the surface of the EVOH layer to thereby retard the delamination between the EVOH layer and the polyester layer.

The multi-layered containers comprising a polyester resin and an EVOH resin and produced in the manner mentioned hereinabove, especially those as produced through coinjection stretch blow molding are, when shocked, prevented from being delaminated, even though they do not have an adhesive resin layer, and, in addition, they have good transparency and good gas barrier properties.

The containers are suitable for preserving various materials therein in good condition for a long period of time, and are especially useful as those for various drinks such as carbonated drinks, beer, wine and others, and also for various foods, cosmetics, etc.

The invention is described in more detail with reference to the following Examples, which, however, are not intended to restrict the scope of the invention. In the following Examples, the samples were analyzed end evaluated according to the methods mentioned below.

(1) Constituent Unit Contents of Polyester

A polyester sample to be analyzed is subjected to ¹H-NMR (nuclear magnetic resonance) using JOEL's JNM- GX-500 Model, for which the solvent is trifluoroacetic acid deuteride, and the constituent unit contents of the polyester are obtained from the resulting $^1$H-NMR spectral chart.

(2) Intrinsic Viscosity (IVa) of Polyester

A sample is taken out of the polyester layer of the body part of a multi-layered container to be analyzed, and its viscosity is measured in a 1/1 (by weight) mixture of solvents, phenol and tetrachloroethane, at 30° C., for which is used an Ubbelohde's viscometer (HRK-3 Model from Hayashi Seisakusho).

(3) Glass Transition Point (TGa) and Melting Point (TMa) of Polyester

A sample is taken out of the polyester layer of the body part of a multi-layered container to be analyzed, and its glass transition point (TGa) and melting point (TMa) are measured through differential scanning calorimetry (DSC) according to JISK7121, for which is used a differential scanning colorimeter (DSC) of RDC220/SSC5200H Model (from Seiko Electronics Industry). Precisely, in the device, the sample is kept at 280° C. for 5 minutes, then cooled to 30° C. at a cooling rate of 100° C./min, kept at the temperature for 5 minutes, and then heated at a heating rate of 10° C./min. Through the heat cycle, TGa and TMa of the sample are obtained. For temperature calibration, used are indium and lead. The glass transition point as referred to herein indicates the midway glass transition point (Tmg) according to JIS K712 1, and the melting point also referred to herein indicates the peak point in melting (Tpm) according to the same.

(4) Terminal Carboxyl Concentration (Ca) of Polyester 0.2 g of a polyester sample as taken out of the polyester layer of the body part of a multi-layered container to be analyzed is dissolved in 10 ml of benzyl alcohol heated at 215° C., to which is added 10 ml of chloroform. The resulting sample solution is filtered with a solution of sodium hydroxide in benzyl alcohol.

(5) Oligomer (cyclic trimer) Content (CTa) of Polyester 100 mg of a polyester sample as taken out of the polyester layer of the body part of a multi-layered container to be analyzed is dissolved in 2 ml of chloroform/1,1,1,3,3,3-hexafluoro-2-propanol (1/1, by volume), and diluted with 8 ml of additional chloroform. Acetonitrile is added to this to make 100 ml in volume, by which the polymer component is reprecipitated. This is then filtered to obtain a filtrate. This filtrate is subjected to high-performance liquid chromatography (column: Chemco's ODS-II) using an eluent of an aqueous solution of 75 vol % acetonitrile, for quantitative analysis based on the UV and visible absorbance and the refractive index to obtain the ethylene terephthalate cyclic trimer content (wt. %) of the sample.

(6) Ethylene Content and Degree of Saponification of EVOH

The ethylene content and the degree of saponification of EVOH are obtained from the $^1$H-NMR (nuclear magnetic resonance) spectral chart of EVOH in a solvent of dimethyl sulfoxide deuteride, for which is used JOEL's JNM-GX-500 Model.

(7) Melting Point of EVOH (TMb)

A sample is taken out of the EVOH layer of the body part of a multi-layered container to be analyzed, and its melting point (TMb) is measured through differential scanning calorimetry (DSC) according to JIS K7121, for which is used a differential scanning calorimeter (DSC) of RDC220/SSC5200H Model (from Seiko Electronics Industry). Precisely, in the device, the sample is kept at 240° C. for 5 minutes, then cooled to 30° C. at a cooling rate of 100° C./min, kept at the temperature for 5 minutes, and then heated at a heating rate of 10° C./min. Through the heat cycle, TMb of the sample is obtained. For temperature calibration, used are indium and lead. The melting point referred to herein indicates the peak point in melting (Tpm) according to JIS K7121.

(8) Melt Index (MIb) of EVOH

This is measured, using a melt indexer, L244 (from Takara Industry). Concretely, EVOH chips are filled into a cylinder having en inner diameter of 9.55 mm end a length of 162 mm, melted therein et 190° C. To the resulting EVOH melt, uniformly applied is a load of a plunger having a weight of 2,160 g and a diameter of 9.48 mm, by which the EVOH is extruded out of the cylinder through the center orifice having a diameter of 2.1 mm, whereupon the flow rate (g/10 min) of the EVOH melt being extruded out is measured. This indicates the melt index MIb of the EVOH sample.

(9) Phosphoric Acid Radical Content of EVOH

The phosphoric acid radical content of EVOH is measured in terms of the phosphoric acid ion ($PO_4^{3-}$) content thereof, according to the following method. Concretely, 10 g of a dry sample of EVOH is put into 50 ml of 0.01 N HCl, and stirred at 95° C. for 6 hours. The resulting solution is quantitatively analyzed through ion chromatography to measure the phosphoric acid ion content of the sample. As the column, used is CIS-A23 (from Yokogawa Electric), for which the eluent is an aqueous solution containing 2.5 mM sodium carbonate and 1.0 mM sodium hydrogencarbonate. The sample quantification is based on the calibration curve of aqueous solutions of phosphoric acid.

(10) Na, K, Mg Ion Contents of EVOH 10 g of dry chips of EVOH to be analyzed are put into 50 ml of 0.01 N HCl, end stirred at 95° C. for 6 hours. The resulting solution is quantitatively analyzed through ion chromatography to measure the Na ion content, the K ion content and the Mg ion content of the sample. As the column, used is ICS-C25 (from Yokogawa Electric),for which the eluent is an aqueous solution containing 5.0 mM tartaric acid and 1.0 mM 2,6-pyridinedicarboxylic acid. The sample quantification is based on the calibration curve of aqueous solutions of sodium chloride, that of aqueous solutions of potassium chloride and that of aqueous solutions of magnesium chloride. From the thus-obtained Na ion, K ion and Mg ion contents, derived are the alkali metal salt content and the alkaline earth metal salt content of the sample both in terms of the metal.

(11) Density (Db) of EVOH

A sample having a size of 0.5 cm×0.5 cm is taken out of the EVOH layer of the body part of a multi-layered container to be analyzed, end the density Db of the EVOH sample is measured in a density gradient tube with n-hexanelcarbon tetrachloride at 25° C.

(12) Density (Da) of Polyester

A sample having a size of 0.5 cm×0.5 cm is taken out of the polyester layer of the body part of a multi-layered container to be analyzed, and the density Da of the polyester sample is measured in a density gradient tube with n-hexane/carbon tetrachloride at 25° C.

(13) Frequency of Delamination of Multi-Layered Container 100 molded bottles each are filled with water and sealed with a stopper under normal pressure. Each bottle with its body being kept horizontally is spontaneously dropped from a height of 50 cm onto a triangular stand having a length of 20 cm and having an angle of 90° at its chip that faces the dropping bottle. The dropping test is effected only once, in which the 90° chip of the stand is targeted to the center of the body of the dropping bottle. From the number of the bottles delaminated in the test, the frequency of delamination is obtained according to the following formula:

Frequency of Delamination (%)=[(number of delaminated bottles)/100]×100.

(14) Haze Value of Multi-Layered Container

The body of a bottle sample to be analyzed is divided into four equal portions around the circumference at its center, and the internal haze of each of those four portions is measured with a Poic integrating-sphere light transmittance/complete light reflectance meter (HR-100 Model from Murakami Color Technology Laboratories) according to ASTM D1003-61. The data are averaged, and the resulting mean value indicates the haze value of the bottle.

(15) Oxygen Transmission Rate Through Multi-Layered Container

Bottle samples to be analyzed are conditioned at 20° C. and 65% RH, and the oxygen transmission rate through each bottle, ml/bottle day atm, is measured with an oxygen transmission rate measuring device, OX-TRAN-10/50A (from Modem Control).

(16) XPS of EVOH Layer (at its surface) of Body of Container

For the X-ray photoelectron spectroscopy (XPS) of the surface of the EVOH layer of the body of a container to be analyzed, used is Shimadzu Corporation's AXIS-HSi. For this, the polyester layer (layer a) and the EVOH layer (layer b) of the container body are peeled, and the exposed interface of the EVOH layer is subjected to XPS.

Concretely, the exposed sample is fixed in the device, and its element constitution is qualitatively determined through wide scanning measurement (from 0 to 1,100 eV). Next, the sample is subjected to narrow scanning measurement for peak integration of each element for a total of 30 minutes. For this, the pressure is $1 \times 10^{-7}$ Pa, and $K\alpha$ of Mg is used as the excitation source. The electric field condition is 15 kV and 8 mA.

In the XPS chart, the highest peak (peak A) of the peaks for the binding energy of C1s electrons appears at around 285 eV. Based on the peak top of the peak A, obtained are the peak area of the peak A, the peak area of the second peak (peak B) appearing in the side higher by from 1.1 to 1.8 eV than the position of the peek A, and the peak area of the third peek (peak C) appearing in the side higher by from 3.6 to 4.3 eV than the position of the peak A, and these are referred to as PA, PB and PC, respectively. In calculating each area, employed is a linear method for background correction in waveform separation, and the curve fitting is based on Gaussian curve fitting 100%. The value of PC/(PA+PB+PC) is obtained from the peak area values PA, PB and PC thus measured.

(17) Transmission Spectrum of Polyester Resin

A polyester resin sample to be analyzed is molded through hot pressing at 280° C. into a sheet having a thickness of 300 μm. The spectral transmission chart of the sheet is obtained, using a W-visible spectrometer, W-2100 (from Shimadzu Corporation).

Having described the present invention, reference will now be made to certain examples which are provided solely for purposes of illustration and are not intended to be limitative.

EXAMPLE 1

The polyester resin used herein was prepared according to the method mentioned below.

(1) 100.000 parts by weight of terephthalic acid and 44.830 parts by weight of ethylene glycol were made into a slurry, to which were added 0.010 parts by weight of germanium dioxide, 0.010 parts by weight of phosphorous acid and 0.010 parts by weight of tetraethylammonium hydroxide. The resulting slurry was heated under pressure (absolute pressure of 2.5 kg/cm²) at 250° C. for esterification to a degree of up to 95%, thereby giving an oligomer. The resulting oligomer was subjected to melt polycondensation under a reduced pressure of 1 mmHg at a temperature of 270° C. to obtain a polyester prepolymer having an intrinsic viscosity of 0.50 dl/g. The resulting polyester prepolymer was extruded through a nozzle into a strand, cooled with water, and pelletized into columnar pellets (diameter: about 2.5 mm, length: about 2.5 mm). The resulting pellets were pre-dried at 160° C. for 5 hours and crystallized. Thus was obtained a crystallized polyester prepolymer.

(2) The constituent unit contents of the polyester prepolymer prepared in (1) were measured through NMR. The terephthalic acid unit content, the ethylene glycol unit content and the diethylene glycol (by-product) unit content of the polyester prepolymer were 50.0 mol %, 48.9 mol % and 1.1 mol %, respectively. The terminal carboxyl content and the melting point of the polyester prepolymer were measured according to the methods mentioned hereinabove, and were 38 microequivalents/g and 253° C., respectively.

Next, the polyester prepolymer was pre-dried at 160° C. for 5 hours and crystallized.

(3) The crystallized polyester prepolymer was subjected to solid-phase polymerization in a rolling-type, vacuum, solid-phase polymerization device, under a reduced pressure of 0.1 mmHg at 220° C. for 10 hours, into a polyester resin having an increased molecular weight.

(4) The constituent unit contents of the polyester resin prepared in (3) were measured through NMR. The terephthalic acid unit content, the ethylene glycol unit content and the diethylene glycol unit content of the polyester resin were 50.0 mol %, 48.9 mol % and 1.1 mol %, respectively.

The intrinsic viscosity, the melting point, the glass transition point TGa, the terminal carboxyl content and the cyclic trimer content of the polyester resin were 0.83 dl/g, 252° C., 80° C., 22 microequivalents/g and 0.32% by weight, respectively.

FIG. 7 shows the spectral transmission chart of a sheet of the polyester resin obtained herein.

As the EVOH resin, used herein was EVOH having an ethylene content (ETb) of 44 mol %, a degree of saponification (SDb) of 97.0%, a melt index (MIb, at 190° C. under a load of 2,160 g) of 5.3 g/10 min. and a melting point of 154° C. The phosphoric acid radical content, the Na ion content, the K ion content and the Mg ion content of this EVOH were measured, and were 80 ppm, 75 ppm, 31 ppm and 20 ppm, respectively.

FIG. 1 shows the DSC chart of the EVOH resin, in which is seen a single peak for crystal fusion.

From those resins, obtained was a two-resin, three-layered parison of PES/EVOH/PES, through coinjection molding, for which was used a coinjection stretch blow molding machine (ASB-50HT Model from Nissei ASB—this is for 2 moldings of 750 ml each). Concretely, the temperature of the PES injection zone was 290° C.; the temperature of the EVOH injection zone was 220° C.; the temperature of the hot runner block in which the two resins, PES and EVOH are combined was 260° C; the temperature of the injection mold core was 15° C.: and the temperature of the injection mold cavity was 15° C.

Next, the resulting parison was heated at 105° C. at its surface, and subjected to stretch blow molding into a two-resin, three-layered, coinjection stretch blow molded bottle. In the body part of the bottle, the inner layer of PES had a mean thickness of 200 μm, the interlayer of EVOH had a mean thickness of 20 μm, and the outer layer of PES had a mean thickness of 70 μm.

In the body part of the bottle, PES of the inner and outer layers was taken out, and the density Da, the intrinsic viscosity IVa, the melting point TMa, the terminal carboxyl content Ca and the cyclic trimer content CTa of the thus-taken out PES were measured. The data are shown in Table 1.

In the body part of the bottle, EVOH was taken out, and its melting point TMb and density Db were measured. The data are shown in Table 2.

FIG. 4 shows the XPS chart of the exposed EVOH layer at its surface, in which the ratio of the peaks by area, PA:PB:PC=65.69:32.01:2.30, and the value of PC/(PA+PB+PC) was 0.0230.

The frequency of delamination of the bottles, the haze of the body part of the bottles, and the oxygen transmission rate through the bottles were measured, and the data are shown in Table 4.

The thermal stability of EVOH used herein was confirmed as follows: The two resins, EVOH and PES prepared herein were molded into a two-resin, three-layered parison of PES/EVOH/PES, through coinjection molding, for which was used the same coinjection stretch blow molding machine es above. Concretely, the temperature of the PES injection zone was 290° C.; the temperature of the EVOH injection zone was 220° C.; the temperature of the hot runner block in which the two resins, PES and EVOH are combined was 260° C.; the temperature of the injection mold core was 15° C.; and the temperature of the injection mold cavity was 15° C. In that condition, the two resins PES and EVOH were kept in the injection zones and in the hot runner block for 30 minutes, and thereafter injected into the mold. The parison thus molded was yellowed in some degree, but had no gel. Its appearance was good.

EXAMPLE 2

A thermoplastic polyester was prepared in the same manner as in Example 1, except that 0.035 parts by weight of antimony trioxide was used as the polymerization catalyst, in place of germanium dioxide. The terephthalic acid unit content, the ethylene glycol unit content and the diethylene glycol unit content of the polyester resin were 50.0 mol %, 48.7 mol % and 1.3 mol %, respectively. The intrinsic viscosity, the melting point, the glass transition point TGa, the terminal carboxyl content and the cyclic trimer content of the polyester resin were 0.82 dl/g, 253° C., 80° C., 24 microequivalents/g and 0.35% by weight, respectively.

The thermoplastic polyester resin prepared herein and the same EVOH resin as in Example 1 were molded in the same manner as in example 1 to obtain two-resin, three-layered, coinjection stretch blow molded bottles. In the body part of each bottle, the inner layer of PES had a mean thickness of 201 μm, the interlayer of EVOH had a mean thickness of 18 μm, and the outer layer of PES had a mean thickness of 69 μm. The bottles obtained herein were analyzed and evaluated in the same manner as in Example 1. The data are in Tables 1 to 4.

EXAMPLE 3

A thermoplastic polyester was prepared in the same manner as in Example 1, except that 96.000 parts by weight of terephthalic acid and 4.000 parts by weight of isophthalic acid were used as the starting monomers in place of 100.000 parts by weight of terephthalic acid, and that 0.035 parts by weight of antimony trioxide was used in pi ace of germanium dioxide. The terephthalic acid unit content, the isophthalic acid unit content, the ethylene glycol unit content and the diethylene glycol unit content of the polyester resin were 48.0 mol %, 2.0 mol %, 48.8 mol % and 1.2 mol %, respectively. The intrinsic viscosity, the melting point, the glass transition point TGa, the terminal carboxyl content and the cyclic trimer content of the polyester resin were 0.85 dl/g, 248° C., 79° C. 23 microequivalents/g and 0.30% by weight, respectively.

The thermoplastic polyester resin prepared herein end the same EVOH resin as in Example 1 were molded in the same manner as in example 1 to obtain two-resin, three-layered, coinjection stretch blow molded bottles. In the body part of each bottle, the inner layer of PES had a mean thickness of 205 μm, the interlayer of EVOH had a mean thickness of 19 μm, and the outer layer of PES had a mean thickness of 70 μm. The bottles obtained herein were analyzed and evaluated in the same manner as in Example 1. The data are in Tables 1 to 4.

EXAMPLE 4

A thermoplastic polyester was prepared in the same manner as in Example 1, except that 3.700 parts by weight of 1,4 cyclohexanedimethanol was used as an additional monomer, and that 0.035 parts by weight of antimony trioxide was used in place of germanium dioxide. The terephthalic acid unit content, the 1,4-cyclohexanedimethanol unit content, the ethylene glycol unit content and the diethylene glycol unit content of the polyester resin were 48.1 mol %, 1.9 mol %, 48.7 mol % and 1.3 mol %, respectively. The intrinsic viscosity, the melting point, the glass transition point TGa, the terminal carboxyl content and the cyclic trimer consent of the polyester resin were 0.85 dl/g, 244° C., 81° C., 26 microequivalents/g and 0.29 % by weight, respectively.

The thermoplastic polyester resin prepared herein end the same EVOH resin as in Example 1 were molded in the same manner as in example I to obtain two-resin, three-layered, coinjection stretch blow molded bottles. In the body part of each bottle, the inner layer of PES had a mean thickness of 201 μm, the interlayer of EVOH had a mean thickness of 19 μm, and the outer layer of PES had a mean thickness of 69 μm. The bottles obtained herein were analyzed and evaluated in the same manner as in Example 1. The data are in Tables 1 to 4.

EXAMPLE 5

A thermoplastic polyester was prepared in the same manner as in Example 1, except that 97.000 parts by weight of terephthalic acid and 4.200 parts by weight of 2,6-naphthalenedicarboxylic acid were used as the starting monomers in place of 100.000 parts by weight of terephthalic acid, and that 0.035 parts by weight of antimony trioxide was used in place of germanium dioxide. The terephthalic acid unit content, the 2,6-naphthalenedicarboxylic acid unit content, the ethylene glycol unit content and the diethylene glycol unit content of the polyester resin were 48.4 mol %, 1.6 mol %, 48.8 mol % and 1.2 mol %, respectively. The intrinsic viscosity, the melting point, the glass transition point TGa, the terminal carboxyl content and the cyclic trimer content of the polyester resin were 0.82 dl/g, 247° C., 83° C., 21 microequivalents/g and 0.29% by weight, respectively.

FIG. 8 shows the spectral transmission chart of a sheet of the polyester resin obtained herein. Comparing this with the spectral transmission chart of the polyester resin of Example 1 not copolymerized with naphthalenedicarboxylic acid, it is known that the transmittance in the W region (from 200 to 400 nm) is lowered in the former. This means that the sheet of the polyester resin of this Example has good UV-shielding ability.

The thermoplastic polyester resin prepared herein and the same EVOH resin as in Example 1 were molded in the same manner as in Example 1 to obtain two-resin, three-layered, coinjection stretch blow molded bottles. In the body part of each bottle, the inner layer of PES had a mean thickness of 206 μm, the interlayer of EVOH had a mean thickness of 22 μm, and the outer layer of PES had a mean thickness of 67 μm. The bottles obtained herein were analyzed and evaluated in the same manner as in Example 1. The data are in Tables 1 to 4.

EXAMPLE 6

In this Example, the same thermoplastic polyester resin as in Example 1 was used, but, as the EVOH resin, used was EVOH having an ethylene content (ETb) of 38 mol %, a degree of saponification (SDb) of 96.5%, a melt index (MIb, at 190° C. under a load of 2,160 g) of 1.6 g/10 min, and a melting point of 162° C. The phosphoric acid radical content, the Na ion content, the K ion content and the Mg ion content of this EVOH were measured, and were 100 ppm, 50 ppm, 50 ppm and 30 ppm, respectively.

The thermoplastic polyester resin and the EVOH resin were molded in the same manner as in Example 1 to obtain two-resin, three-layered, coinjection stretch blow molded bottles. In the body part of each bottle, the inner layer of PES had a mean thickness of 202 μm, the interlayer of EVOH had a mean thickness of 19 μm, and the outer layer of PES had a mean thickness of 68 μm. The bottles obtained herein were analyzed and evaluated in the same manner as in Example 1. The data are in Tables 1 to 4.

The thermal stability of EVOH used herein was confirmed as follows: The two resins, EVOH and PES as herein were molded into a two-resin, three-layered parison of PES/EVOH/PES, through coinjection molding, for which was used the same coinjection stretch blow molding machine as in Example 1. Concretely, the temperature of the PES injection zone was 290° C.; the temperature of the EVOH injection zone was 220° C.; the temperature of the hot runner block in which the two resins, PES and EVOH are combined was 260° C.; the temperature of the injection mold core was 15° C.; and the temperature of the injection mold cavity was 15° C. In that condition, the two resins PES and EVOH were kept in the injection zones and in the hot runner block for 30 minutes, and thereafter injected into the mold. The parison thus molded was yellowed in some degree, but had no gel. Its appearance was good.

EXAMPLE 7

In this Example, the same thermoplastic polyester resin as in Example 1 was used, but, as the EVOH resin, used was EVOH having an ethylene content (ETb) of 32 mol %, a degree of saponification (SDb) of 97.0%, a melt index (MIb, at 190° C. under a load of 2,160 g) of 1.2 g/10 min. and a melting point of 172° C. The phosphoric acid radical content, the Na ion content, the K ion content and the Mg ion content of this EVOH were measured, and were 90 ppm, 70 ppm, 50 ppm and 55 ppm, respectively.

The thermoplastic polyester resin and the EVOH resin were molded in the same manner as in Example 1 to obtain two-resin, three-layered, coinjection stretch blow molded bottles. In the body part of each bottle, the inner layer of PES had a mean thickness of 202 μm, the interlayer of EVOH had a mean thickness of 21 μm, and the outer layer of PES had a mean thickness of 69 μm. The bottles obtained herein were analyzed and evaluated in the same manner as in Example 1. The data are in Tables 1 to 4.

The thermal stability of EVOH used herein was confirmed as follows: The two resins, EVOH and PES as herein were molded into a two-resin, three-layered parison of PES/EVOH/PES, through coinjection molding, for which was used the same coinjection stretch blow molding machine as in Example 1. Concretely, the temperature of the PES injection zone was 290° C.; the temperature of the EVOH injection zone was 220° C.; the temperature of the hot runner block in which the two resins, PES and EVOH are combined was 260° C.; the temperature of the injection mold core was 15° C.; and the temperature of the injection mold cavity was 15° C. In that condition, the two resins PES and EVOH were kept in the injection zones and in the hot runner block for 30 minutes, and thereafter injected into the mold. The parison thus molded was yellowed in some degree, and had minor gels.

EXAMPLE 8

In this Example, the same thermoplastic polyester resin as in Example 1 was used, but, as the EVOH resin, used was EVOH having an ethylene content (ETb) of 44 mol %, a degree of saponification (SDb) of 97.0%, a vinyltrimethoxysilane content of 0.05 mol %, a melt index (MIb, at 190° C. under a load of 2,160 g) of 1.7 g/10 min. and a melting point of 153° C. The phosphoric acid radical content, the Na ion content, the K ion content and the Mg ion content of this EVOH were measured, and were 80 ppm, 80 ppm, 40 ppm and 60 ppm, respectively.

The thermoplastic polyester resin and the EVOH resin were molded in the same manner as in Example 1 to obtain two-resin, three-layered, coinjection stretch blow molded bottles. In the body part of each bottle, the inner layer of PES had a mean thickness of 200 μm, the interlayer of EVOH had a mean thickness of 20 μm, and the outer layer of PES had a mean thickness of 69 μm. The bottles obtained herein were analyzed and evaluated in the same manner as in Example 1. The data are in Tables 1 to 4.

EXAMPLE 9

In this Example, the same thermoplastic polyester resin as in Example 1 was used, but, as the EVOH resin, used was EVOH having an ethylene content (ETb) of 38 mol %, a degree of saponification (SDb) of 97.0%, a vinyltrimethoxysilane content of 0.02 mol %, a melt index (MIb, at 190° C. under a load of 2,160 g) of 5.0 g/10 min, and a melting point of 163° C. The phosphoric acid radical content, the Na ion content, the K ion content and the Mg ion content of this EVOH were measured, and were 100 ppm, 75 ppm, 45 ppm and 55 ppm, respectively.

The thermoplastic polyester resin and the EVOH resin were molded in the same manner as in Example 1 to obtain two-resin, three-layered, coinjection stretch blow molded bottles. In the body part of each bottle, the inner layer of PES had a mean thickness of 204 μm. the interlayer of EVOH had a mean thickness of 18 μm, and the outer layer of PES had a mean thickness of 67 μm. The bottles obtained herein were analyzed end evaluated in the same manner as in Example 1. The data are in Tables 1 to 4.

EXAMPLE 10

In this Example, the same thermoplastic polyester resin as in Example 1 was used, but, as the EVOH resin, used was EVOH having an ethylene content (ETb) of 38 mol %, a degree of saponification (SDb) of 96.5%, a boric acid content of 230 ppm (in terms of the boron element), a melt index (MIb, at 190° C. under a load of 2,160 g) of 1.8 g/10 min, and a melting point of 161° C. The phosphoric acid radical content, the Na ion content, the K ion content and the Mg ion content of this EVOH were measured, and were 90 ppm, 70 ppm, 45 ppm and 50 ppm, respectively.

The thermoplastic polyester resin and the EVOH resin were molded in the same manner as in Example 1 to obtain two-resin, three-layered, coinjection stretch blow molded bottles. In the body part of each bottle, the inner layer of PES had a mean thickness of 201 μm, the interlayer of EVOH had a mean thickness of 20 μm, and the outer layer of PES had a mean thickness of 70 μm. The bottles obtained herein were analyzed end evaluated in the same manner as in Example 1. The data are in Tables 1 to 4.

EXAMPLE 11

In this Example, the same thermoplastic polyester resin as in Example 1 was used, but, as the EVOH resin, used was an EVOH composition that had been prepared by dry-blending 100 parts by weight of EVOH having an ethylene content (ETbl) of 44 mol %, a degree of saponification (SDb1) of 99.8%, a melt index (MIb1, at 190° C. under a load of 2,160 g) of 5.5 g/10 min, and a melting point of 166° C., and 100 parts by weight of EVOH having an ethylene content (ETb2) of 44 mol %, a degree of saponification (SDb2) of 97.0%, a melt index (MIb2, at 190° C. under a load of 2,160 g) of 5.3 g/10 min, and a melting point of 154° C., followed by pelletizing the resulting EVOH blend through a 20-mmφ double-screw extruder at 200° C., and then drying the resulting pellets under reduced pressure at 80° C. for 16 hours. The EVOH composition used herein had a melt index (MIb, at 190° C. under a load of 2,160 g) of 5.2 g/10 min and a melting point of 161° C. The phosphoric acid radical content, the Na ion content, the K ion content and the Mg ion content of the EVOH composition were measured, and were 100 ppm, 80 ppm, 50 ppm and 50 ppm, respectively. FIG. 2 shows the DSC chart of the EVOH composition, in which is seen a single peak for crystal fusion.

The thermoplastic polyester resin and the EVOH composition were molded in the same manner as in Example 1 to obtain two-resin, three-layered, coinjection stretch blow molded bottles. In the body part of each bottle, the inner layer of PES had a mean thickness of 203 μm, the interlayer of EVOH had a mean thickness of 18 μm, and the outer layer of PES had a mean thickness of 67 gm. The bottles obtained herein were analyzed and evaluated in the same manner as in Example 1. The data are in Tables 1 to 4.

FIG. 5 shows the XPS chart of the exposed EVOH layer at its surf ace, in which the ratio of the peaks by area, PA:PB:PC 68.09:30.27:1.63, and the value of PC/(PA+PB+PC) was 0.0163.

EXAMPLE 12

In this Example, the same thermoplastic polyester resin as in Example 1 was used, but, as the EVOH resin, used was an EVOH composition that had been prepared by dry-blending 100 parts by weight of EVOH having an ethylene content (ETb1) of 38 mol %, a degree of saponification (SDb1) of 99.8%, a melt index (MIb1, at 190° C. under a load of 2,160 g) of 1.6 g/10 min, and a melting point of 177° C., and 100 parts by weight of EVOH having an ethylene content (ETb2) of 38 mol %, a degree of saponification (SDb2) of 96.5%, a melt index (MIb2, at 190° C. under a load of 2,160 g) of 1.6 g/10 min, and a melting point of 162° C., followed by pelletizing the resulting EVOH blend through a 20-mmφ double-screw extruder at 200° C., and then drying the resulting pellets under reduced pressure at 80° C. for 16 hours. The EVOH composition used herein had a melt index (MIb, at 190° C. under a load of 2,160 g) of 1.4 g/10 min and a melting point of 166° C. (as a single peak in melting). The phosphoric acid radical content, the Na ion content, the K ion content and the Mg ion content of the EVOH composition were measured, and were 95 ppm, 75 ppm, 50 ppm and 55 ppm, respectively.

The thermoplastic polyester resin and the EVOH composition were molded in the same manner as in Example 1 to obtain two-resin, three-layered, coinjection stretch blow molded bottles. In the body part of each bottle, the inner layer of PES had a mean thickness of 201 μm, the interlayer of EVOH had a mean thickness of 20 μm, and the outer layer of PES had a mean thickness of 69 μm. The bottles obtained herein were analyzed and evaluated in the same manner as in Example 1. The data are in Tables 1 to 4.

EXAMPLE 13

In this Example, the same thermoplastic polyester resin as in Example 1 was used, but, as the EVOH resin, used was an EVOH composition that had been prepared by dry-blending 100 parts by weight of EVOH having an ethylene content (ETb1) of 32 mol %, a degree of saponification (SDb1) of 99.8%, a melt index (MIb1, at 190° C. under a load of 2,160 g) of 1.2 g/10 min, and a melting point of 183° C., and 100 parts by weight of EVOH having an ethylene content (ETb2) of 32 mol %, a degree of saponification (SDb2) of 97.0%, a melt index (MIb2, at 190° C. under a load of 2,160 g) of 1.2 g/10 min, and a melting point of 172° C., followed by pelletizing the resulting EVOH blend through a 20-mmφ double-screw extruder at 200° C., and then drying the resulting pellets under reduced pressure at 80° C. for 16 hours. The EVOH composition used herein had a melt index (MIb, at 190° C. under a load of 2,160 g) of 1.1 g/10 min and a melting point of 177° C. (as a single peak in melting). The phosphoric acid radical content, the Na ion content, the K ion content and the Mg ion content of the EVOH composition were measured, and were 90 ppm, 75 ppm, 45 ppm and 45 ppm, respectively.

The thermoplastic polyester resin and the EVOH composition were molded in the same manner as in Example 1 to obtain two-resin, three-layered, coinjection stretch blow molded bottles. In the body part of each bottle, the inner layer of PES had a mean thickness of 200 μm, the interlayer of EVOH had a mean thickness of 20 μm, and the outer layer of PES had a mean thickness of 70 μm. The bottles obtained herein were analyzed and evaluated in the same manner as in Example 1. The data are in Tables 1 to 4.

EXAMPLE 14

In this Example, the same thermoplastic polyester resin as in Example 1 was used, but, as the EVOH resin, used was an EVOH composition that had been prepared by dry-blending 100 parts by weight of EVOH having an ethylene content (ETb1) of 44 mol %, a degree of saponification (SDb1) of 99.7%, a vinyltrimethoxysilane content of 0.05 mol %, a melt index (MIb1, at 190° C. under a load of 2,160 g) of 1.8 g/10 min, and a melting point of 165° C., and 100 parts by weight of EVOH having an ethylene content (ETb2) of 44 mol %, a degree of saponification (SDb2) of 97.0%, a vinyltrimethoxysilane content of 0.05 mol %, a melt index (MIb2, at 190° C. under a load of 2,160 g) of 1.7 g/10 min, and a melting point of 153° C., followed by pelletizing the resulting EVOH blend through a 20-mmφ double-screw extruder at 200° C., and then drying the resulting pellets under reduced pressure at 80° C. for 16 hours. The EVOH composition used herein had a melt index (MIb, at 190° C. under a load of 2,160 g) of 1.6 g/10 min and a melting point of 157° C. (as a single peak in melting). The phosphoric acid radical content, the Na ion content, the K ion content and the Mg ion content of the EVOH composition were measured, and were 90 ppm, 90 ppm, 60 ppm and 50 ppm, respectively.

The thermoplastic polyester resin and the EVOH composition were molded in the same manner as in Example 1 to obtain two-resin, three-layered, coinjection stretch blow molded bottles. In the body part of each bottle, the inner layer of PES had a mean thickness of 203 μm, the interlayer of EVOH had a mean thickness of 19 μm, and the outer layer of PES had a mean thickness of 69 μm. The bottles obtained herein were analyzed and evaluated in the same manner as in Example 1. The data are in Tables 1 to 4.

EXAMPLE 15

In this Example, the same thermoplastic polyester resin as in Example 1 was used, but, as the EVOH resin, used was an EVOH composition that had been prepared by dry-blending 100 parts by weight of EVOH having an ethylene content (ETb1) of 38 mol %, a degree of saponification (SDb1) of 99.8%, a boric acid content of 230 ppm (in terms of the boron element), a melt index (MIb1, at 190° C. under a load of 2,160 g) of 1.6 g/10 min, and a melting point of 176° C., and 100 parts by weight of EVOH having an ethylene content (ETb2) of 38 mol %, a degree of saponification (SDb2) of 96.5%, a boric acid content of 230 ppm (in terms of the boron element), a melt index (MIb2, at 190° C. under a load of 2,160 g) of 1.8 g/10 min, and a melting point of 161° C., followed by pelletizing the resulting EVOH blend through a 20-mmφ double-screw extruder at 200° C., and then drying the resulting pellets under reduced pressure at 80° C. for 16 hours. The EVOH composition used herein had a melt index (MIb, at 190° C. under a load of 2,160 g) of 1.6 g/10 min and a melting point of 165° C. (as a single peak in melting). The phosphoric acid radical content, the Na ion content, the K ion content and the Mg ion content of the EVOH composition were measured, and were 95 ppm, 90 ppm, 55 ppm and 50 ppm, respectively.

The thermoplastic polyester resin and the EVOH composition were molded in the same manner as in Example 1 to obtain two-resin, three-layered, coinjection stretch blow molded bottles. In the body part of each bottle, the inner layer of PES had a mean thickness of 201 μm, the interlayer of EVOH had a mean thickness of 20 μm, and the outer layer of PES had a mean thickness of 69 μm. The bottles obtained herein were analyzed and evaluated in the same manner as in Example 1. The data are in Tables 1 to 4.

Comparative Example 1

In this Comparative Example, the same thermoplastic polyester resin as in Example 1 was used, but, as the EVOH resin, used was EVOH having an ethylene content (ETb) of 44 mol %, a degree of saponification (SDb) of 99.8%, a melt index (MIb, at 190° C. under a load of 2,160 g) of 5.5 g/10 min, and a melting point of 166° C. The phosphoric acid radical content, the Na ion content, the K ion content and the Mg ion content of this EVOH were measured, and were 75 ppm, 75 ppm, 30 ppm and 20 ppm, respectively.

The thermoplastic polyester resin and the EVOH resin were molded in the same manner as in Example 1 to obtain two-resin, three-layered, coinjection stretch blow molded bottles. In the body part of each bottle, the inner layer of PES had a mean thickness of 201 μm, the interlayer of EVOH had a mean thickness of 20 μm, and the outer layer of PES had a mean thickness of 70 μm. The bottles obtained herein were analyzed and evaluated in the same manner as in Example 1. The data are in Tables 1 to 4.

FIG. 6 shows the XPS chart of the exposed EVOH layer at its surface, in which the ratio of the peaks by area, PA:PB:PC =65.22:33.54:1.24, and the value of PC/(PA+PB+PC) was 0.0124.

Comparative Example 2

In this Comparative Example, the same thermoplastic polyester resin as in Example 1 was used, but, as the EVOH resin, used was EVOH having an ethylene content (ETb) of 52 mol %, a degree of saponification (SDb) of 94.8%, a melt index (MIb, at 190° C. under a load of 2,160 g) of 6.8 g/10 min, and a melting point of 141° C. The phosphoric acid radical content, the Na ion content, the K ion content and the Mg ion content of this EVOH were measured, and were 80 ppm, 75 ppm, 35 ppm and 25 ppm, respectively.

The thermoplastic polyester resin and the EVOH resin were molded in the same manner as in Example 1 to obtain two-resin, three-layered, coinjection stretch blow molded bottles. In the body part of each bottle, the inner layer of PES had a mean thickness of 197 μm, the interlayer of EVOH had a mean thickness of 16 μm, and the outer layer of PES had a mean thickness of 73 μm. The bottles obtained herein were analyzed and evaluated in the same manner as in Example 1. The data are in Tables 1 to 4.

Comparative Example 3

In this Comparative Example, the same thermoplastic polyester resin as in Example 1 was used, but, as the EVOH resin, used was EVOH having an ethylene content (ETb) of 48 mol %, a degree of saponification (SDb) of 99.7%, a vinyltrimethoxysilane content of 0.02 mol %, a melt index (MIb, at 190° C. under a load of 2,160 g) of 6.4 g/10 min, and a melting point of 159° C. The phosphoric acid radical content, the Na ion content, the K ion content and the Mg ion content of this EVOH were measured, and were 100 ppm, 80 ppm, 45 ppm and 60 ppm, respectively.

The thermoplastic polyester resin and the EVOH resin were molded in the same manner as in Example 1 to obtain two-resin, three-layered, coinjection stretch blow molded bottles. In the body part of each bottle, the inner layer of PES had a mean thickness of 204 μm, the interlayer of EVOH had a mean thickness of 17 μm, and the outer layer of PES had a mean thickness of 67 μm. The bottles obtained here in were analyzed and evaluated in the same manner as in Example 1. The data are in Tables 1 to 4.

Comparative Example 4

In this Comparative Example, the same thermoplastic polyester resin as in Example 1 was used, but, as the EVOH resin, used was EVOH having an ethylene content (ETb) of 48 mol %, a degree of saponification (SDb) of 99.4%, a melt index (MIb, at 190° C. under a load of 2,160 g) of 14.4 g/10 min, and a melting point of 155° C. The phosphoric acid radical content, the Na ion content, the K ion content and the Mg ion content of this EVOH were measured, and were 100 ppm, 50 ppm, 25 ppm and 20 ppm, respectively.

The thermoplastic polyester resin and the EVOH resin were molded in the same manner as in Example 1 to obtain two-resin, three-layered, coinjection stretch blow molded bottles. In the body part of each bottle, the inner layer of PES had a mean thickness of 205 μm, the interlayer of EVOH had a mean thickness of 6 μm, and the outer layer of PES had a mean thickness of 75 μm. The bottles obtained herein were analyzed and evaluated in the same manner as in Example 1. The data are in Tables 1 to 4.

Comparative Example 5

In this Comparative Example, the same thermoplastic polyester resin as in Example 1 was used, but, as the EVOH resin, used was EVOH having an ethylene content (ETb) of 38 mol %, a degree of saponification (SDb) of 99.8%, a melt index (MIb, at 190° C. under a load of 2,160 g) of 1.6 g/10 min, and a melting point of 177° C. The phosphoric acid radical content, the Na ion content, the K ion content and the Mg ion content of this EVOH were measured, and were 80 ppm, 60 ppm, 45 ppm and 50 ppm, respectively.

The thermoplastic polyester resin and the EVOH resin were molded in the same manner as in Example 1 to obtain two-resin, three-layered, coinjection stretch blow molded bottles. In the body part of each bottle, the inner layer of PES had a mean thickness of 202 μm, the interlayer of EVOH had a mean thickness of 16 μm, and the outer layer of PES had a mean thickness of 69 μm. The bottles obtained herein were analyzed and evaluated in the same manner as in Example 1. The data are in Tables 1 to 4.

Comparative Example 6

In this Comparative Example, the same thermoplastic polyester resin as in Example 1 was used, but, as the EVOH resin, used was EVOH having an ethylene content (ETb) of 32 mol %, a degree of saponification (SDb) of 99.8%, a melt index (MIb, at 190° C. under a load of 2,160 g) of 1.2 g/10 min, and a melting point of 183° C. The phosphoric acid radical content, the Na ion content, the K ion content and the Mg ion content of this EVOH were measured, and were 70 ppm, 55 ppm, 50 ppm and 55 ppm, respectively.

The thermoplastic polyester resin and the EVOH resin were molded in the same manner as in Example 1 to obtain two-resin, three-layered, coinjection stretch blow molded bottles. In the body part of each bottle, the inner layer of PES had a mean thickness of 200 μm, the interlayer of EVOH had a mean thickness of 20 μm, and the outer layer of PES had a mean thickness of 70 μm. The bottles obtained herein were analyzed and evaluated in the same manner as in Example 1. The data are in Tables 1 to 4.

Comparative Example 7

In this Comparative Example, the same thermoplastic polyester resin as in Example 1 was used, but, as the EVOH resin, used was EVOH having an ethylene content (ETb) of 20 mol %, a degree of saponification (SDb) of 96.5%, a melt index (MIb, at 190° C. under a load of 2,160 g) of 1.1 g/10 min, and a melting point of 188° C. The phosphoric acid radical content, the Na ion content, the K ion content and the Mg ion content of this EVOH were measured, and were 80 ppm, 70 ppm, 60 ppm and 55 ppm, respectively.

The thermoplastic polyester resin and the EVOH resin were molded in the same manner as in Example 1 to obtain two-resin, three-layered, coinjection stretch blow molded bottles. In the body part of each bottle, the inner layer of PES had a mean thickness of 203 μm, the interlayer of EVOH had a mean thickness of 17 μm, and the outer layer of PES had a mean thickness of 68 μm. The bottles obtained herein had many gels. These were analyzed and evaluated in the same manner as in Example 1. The data are in Tables 1 to 4.

Comparative Example 8

In this Comparative Example, the same thermoplastic polyester resin as in Example 1 was used, but, as the EVOH resin, used was EVOH having an ethylene content (ETb) of 44 mol %, a degree of saponification (SDb) of 90.0%, a melt index (MIb, at 190° C. under a load of 2,160 g) of 5.3 g/10 min, and a melting point of 136° C. The phosphoric acid radical content, the Na ion content, the K ion content and the Mg ion content of this EVOH were measured, and were 90 ppm, 50 ppm, 55 ppm and 40 ppm, respectively.

The thermoplastic polyester resin and the EVOH resin were molded in the same manner as in Example 1 to obtain two-resin, three-layered, coinjection stretch blow molded bottles. In the body part of each bottle, the inner layer of PES had a mean thickness of 204 μm, the interlayer of EVOH had a mean thickness of 17 μm, and the outer layer of PES had a mean thickness of 67 μm. The bottles obtained herein had many gels. These were analyzed and evaluated in the same manner as in Example 1. The data are in Tables 1 to 4.

Comparative Example 9

In this Comparative Example, the same thermoplastic polyester resin as in Example 1 was used, but, as the EVOH resin, used was an EVOH composition that had been prepared by dry-blending 100 parts by weight of EVOH having an ethylene content (ETb1) of 32 mol %, a degree of saponification (SDb1) of 99.8%, a melt index (MIb1, at 190° C. under a load of 2,160 g) of 1.6 g/10 min, and a melting point of 183° C., and 100 parts by weight of EVOH having an ethylene content (ETb2) of 80 mol %, a degree of saponification (SDb2) of 90.0%, a melt index (MIb2, at 190° C. under a load of 2,160 g) of 38 g/10 min, and a melting point of 109° C., followed by pelletizing the resulting EVOH blend through a 20-mmφ double-screw extruder at 200° C., and then drying the resulting pellets under reduced pressure at 80° C. for 16 hours. The EVOH composition used herein had a melt index (MIb, at 190° C. under a load of 2,160 g) of 2.6 g/10 min, and gave two peaks at 183° C. and at 108° C. in melting it. The phosphoric acid radical content, the Na ion content, the K ion content and the Mg ion content of the EVOH composition were measured, and were 45 ppm, 40 ppm, 35 ppm and 30 ppm, respectively. FIG. 3 shows the DSC chart of the EVOH composition, in which are seen two peaks for crystal fusion.

The thermoplastic polyester resin and the EVOH composition were molded in the same manner as in Example 1 to obtain two-resin, three-layered, coinjection stretch blow molded bottles. In the body part of each bottle, the inner layer of PES had a mean thickness of 204 μm, the interlayer of EVOH had a mean thickness of 19 μm, and the outer layer of PES had a mean thickness of 69 μm. The bottles obtained herein had many gels. These were analyzed and evaluated in the same manner as in Example 1. The data are in Tables 1 to 4.

TABLE 1

Analysis and Evaluation of Thermoplastic Polyester Resins

| | DEG Content mol % | Comonomer 1*) mol % | Polymerization Catalyst | Intrinsic Viscosity IVa dl/g | Density Da g/cm³ | Glass Transition Point TGa °C. | Melting Point TMa °C. | Terminal Carboxyl Content Ca micro-equivalents/g | Oligomer Content Ca wt. % |
|---|---|---|---|---|---|---|---|---|---|
| Example 1 | 1.1 | — | Ge | 0.80 | 1.369 | 80 | 253 | 26 | 0.37 |
| Example 2 | 1.3 | — | Sb | 0.79 | 1.370 | 80 | 253 | 29 | 0.42 |
| Example 3 | 1.2 | IPA 2.0 | Sb | 0.82 | 1.364 | 79 | 247 | 27 | 0.33 |
| Example 4 | 1.3 | CHDM 1.9 | Sb | 0.83 | 1.362 | 81 | 246 | 29 | 0.32 |
| Example 5 | 1.2 | NDC 1.6 | Sb | 0.78 | 1.363 | 83 | 246 | 25 | 0.32 |
| Example 6 | 1.1 | — | Ge | 0.80 | 1.369 | 80 | 253 | 26 | 0.36 |
| Example 7 | 1.1 | — | Ge | 0.80 | 1.369 | 80 | 253 | 27 | 0.37 |
| Example 8 | 1.1 | — | Ge | 0.80 | 1.369 | 80 | 253 | 26 | 0.37 |
| Example 9 | 1.1 | — | Ge | 0.80 | 1.369 | 80 | 253 | 26 | 0.37 |
| Example 10 | 1.1 | — | Ge | 0.80 | 1.369 | 80 | 253 | 25 | 0.35 |
| Example 11 | 1.1 | — | Ge | 0.80 | 1.369 | 80 | 253 | 27 | 0.37 |
| Example 12 | 1.1 | — | Ge | 0.80 | 1.369 | 80 | 253 | 26 | 0.37 |
| Example 13 | 1.1 | — | Ge | 0.80 | 1.369 | 80 | 253 | 26 | 0.37 |
| Example 14 | 1.1 | — | Ge | 0.80 | 1.369 | 80 | 253 | 25 | 0.37 |
| Example 15 | 1.1 | — | Ge | 0.80 | 1.369 | 80 | 253 | 26 | 0.38 |
| Comparative Example 1 | 1.1 | — | Ge | 0.80 | 1.369 | 80 | 253 | 26 | 0.37 |
| Comparative Example 2 | 1.1 | — | Ge | 0.80 | 1.367 | 80 | 253 | 26 | 0.37 |
| Comparative Example 3 | 1.1 | — | Ge | 0.80 | 1.368 | 80 | 253 | 25 | 0.36 |
| Comparative Example 4 | 1.1 | — | Ge | 0.80 | 1.371 | 80 | 253 | 26 | 0.36 |
| Comparative Example 5 | 1.1 | — | Ge | 0.80 | 1.369 | 80 | 253 | 26 | 0.37 |
| Comparative Example 6 | 1.1 | — | Ge | 0.80 | 1.369 | 80 | 253 | 26 | 0.37 |
| Comparative Example 7 | 1.1 | — | Ge | 0.80 | 1.369 | 80 | 253 | 25 | 0.36 |
| Comparative Example 8 | 1.1 | — | Ge | 0.80 | 1.369 | 80 | 253 | 27 | 0.37 |
| Comparative Example 9 | 1.1 | — | Ge | 0.80 | 1.369 | 80 | 253 | 26 | 0.37 |

TABLE 2

Analysis and Evaluation of EVOH Resins

| | Ethylene Content Etb mol % | Degree of Saponification SDb % | Melt Index Mib g/10 min | Density Db g/cm³ | Melting Point TMb °C. |
|---|---|---|---|---|---|
| Example 1 | 44 | 97.0 | 5.3 | 1.135 | 154 |
| Example 2 | 44 | 97.0 | 5.3 | 1.135 | 154 |
| Example 3 | 44 | 97.0 | 5.3 | 1.134 | 154 |
| Example 4 | 44 | 97.0 | 5.3 | 1.134 | 154 |
| Example 5 | 44 | 97.0 | 5.3 | 1.135 | 154 |
| Example 6 | 38 | 96.5 | 1.6 | 1.162 | 162 |
| Example 7 | 32 | 97.0 | 1.2 | 1.180 | 172 |
| Example 8 | 44 | 97.0 | 1.7 | 1.133 | 153 |
| Example 9 | 38 | 97.0 | 5.0 | 1.163 | 163 |
| Example 10 | 38 | 96.5 | 1.8 | 1.160 | 161 |
| Comparative Example 1 | 44 | 99.8 | 5.5 | 1.142 | 166 |
| Comparative Example 2 | 52 | 94.8 | 6.8 | 1.103 | 141 |
| Comparative Example 3 | 48 | 99.7 | 6.4 | 1.119 | 159 |
| Comparative Example 4 | 48 | 99.4 | 14.4 | 1.120 | 155 |
| Comparative Example 5 | 38 | 99.8 | 1.6 | 1.171 | 177 |
| Comparative Example 6 | 32 | 99.8 | 1.2 | 1.190 | 183 |
| Comparative Example 7 | 20 | 96.5 | 1.1 | 1.212 | 188 |
| Comparative Example 8 | 44 | 90.0 | 5.3 | 1.108 | 136 |

TABLE 3

Analysis and Evaluation of EVOH Resin Compositions

| | Ethylene Content ETb1 ETb2 mol % | Degree of Saponification SDb1 SDb2 % | Melt Index Mlb1 Mlb2 g/10 min | Melting Point TMb1 TMb2 °C. | Melt Index Mlb g/10 min | Density Db g/cm³ | Melting Point TMb °C. |
|---|---|---|---|---|---|---|---|
| Example 11 | 44 44 | 99.8 97.0 | 5.5 5.3 | 166 154 | 5.2 | 1.137 | 161 (single peak) |
| Example 12 | 38 38 | 99.8 96.5 | 1.6 1.6 | 177 162 | 1.4 | 1.165 | 166 (single peak) |

TABLE 3-continued

Analysis and Evaluation of EVOH Resin Compositions

| | Ethylene Content ETb1 ETb2 mol % | Degree of Saponification SDb1 SDb2 % | Melt Index Mlb1 Mlb2 g/ 10 min | Melting Point TMb1 TMb2 °C. | Melt Index Mlb g/ 10 min | Density Db g/cm³ | Melting Point TMb °C. |
|---|---|---|---|---|---|---|---|
| Example 13 | 32 / 32 | 99.8 / 97.0 | 1.2 / 1.2 | 183 / 172 | 1.1 | 1.184 | 177 (single peak) |
| Example 14 | 44 / 44 | 99.7 / 97.0 | 1.8 / 1.7 | 165 / 153 | 1.6 | 1.135 | 157 (single peak) |
| Example 15 | 38 / 38 | 99.8 / 96.5 | 1.6 / 1.8 | 176 / 161 | 1.6 | 1.164 | 165 (single peak) |
| Comparative Example 9 | 32 / 80 | 99.8 / 90.0 | 1.6 / 38 | 183 / 109 | 2.6 | 1.138 | 183 / 108 |

TABLE 4

Evaluation of Bottles

| | Frequency of Delamination % | Haze Value % | Oxygen Transmission Rate *1) |
|---|---|---|---|
| Example 1 | 6 | 2.7 | 0.116 |
| Example 2 | 8 | 4.2 | 0.124 |
| Example 3 | 4 | 2.2 | 0.120 |
| Example 4 | 2 | 2.0 | 0.120 |
| Example 5 | 3 | 2.3 | 0.109 |
| Example 6 | 4 | 2.5 | 0.098 |
| Example 7 | 3 | 2.4 | 0.076 |
| Example 8 | 5 | 2.6 | 0.108 |
| Example 9 | 4 | 2.5 | 0.92 |
| Example 10 | 6 | 2.5 | 0.93 |
| Example 11 | 5 | 2.8 | 0.101 |
| Example 12 | 4 | 2.7 | 0.078 |
| Example 13 | 3 | 2.7 | 0.065 |
| Example 14 | 6 | 2.8 | 0.091 |
| Example 15 | 5 | 2.6 | 0.072 |
| Comparative Example 1 | 85 | 2.5 | 0.086 |
| Comparative Example 2 | 5 | 2.7 | 0.283 |
| Comparative Example 3 | 14 | 2.9 | 0.113 |
| Comparative Example 4 | 28 | 2.8 | 0.192 |
| Comparative Example 5 | 83 | 3.2 | 0.063 |
| Comparative Example 6 | 82 | 3.5 | 0.052 |
| Comparative Example 7 | 76 | 3.3 | 0.271 |
| Comparative Example 8 | 5 | 2.4 | 0.324 |
| Comparative Example 9 | 45 | 10.3 | 0.203 |

*1) ml/bottle · day · atom

From the data above, it is known that the blow molded containers of Examples 1 to 15, each of which contains a thermoplastic polyester (layer a) and an ethylene-vinyl alcohol copolymer layer (layer b), with the layer a being kept in direct contact with both surfaces of the layer b, and in which the ethylene-vinyl alcohol copolymer satisfies the following formulae (1) and (2) and its differential scanning calorimetry (DSC) gives a single peak for crystal fusion:

$$25 \leq ETb \leq 48 \quad (1)$$

$$92 \leq SDb \leq 99 \quad (2)$$

wherein;
ETb indicates the ethylene content (mol %) of the ethylene-vinyl alcohol copolymer,
and SDb indicates the degree of saponification (%) of the ethylene-vinyl alcohol copolymer,
have good delamination resistance (frequency of delamination: at most 10%), good transparency (haze: at most 5) and good gas barrier properties (oxygen transmission rate: at most 0.15 ml/bottle·day·atm).

As opposed to those, the bottles of Comparative Examples 1 to 9 not satisfying the requirements as above could not attain the effect of the invention. Specifically, the frequency of delamination of comparative bottles in which EVOH has a degree of saponification SDb of larger than 99% (Comparative Examples 1, 3, 4, 5 and 6) is larger than 10%, irrespective of the ethylene content of EVOH constituting them. On the other hand, the gas barrier properties of comparative bottles in which EVOH has a degree of saponification SDb of smaller than 92% (Comparative Example 8) are very poor. In addition, EVOH having such a small degree of saponification, SDb, has poor thermal stability, and the moldings comprising it shall have much gels. The gas barrier properties of comparative bottles in which the ethylene content, ETb, of EVOH is too high (Comparative Example 2) are also very poor. The frequency of delamination of comparative bottles in which the ethylene content, ETb, of EVOH is too low (Comparative Example 7) is high. In addition, since EVOH with such a low ethylene content ETb has poor melt stability, and therefore, the gas barrier properties of the bottles comprising it are low.

As in Comparative Example 9, where two different EVOHs which greatly differ from each other with respect to the ethylene content and the degree of saponification are combined to prepare an EVOH composition, the DSC chart of the EVOH composition gives two peaks for crystal fusion, even though the mean ethylene content and the mean degree of saponification of the EVOH composition satisfy the defined ranges. This case could not attain the object of the invention that is directed to the reduction in the frequency of delamination, and, in addition, the moldings comprising the EVOH composition shall have low transparency.

As opposed to this, in Examples 11 to 15, two different EVOHs are combined to prepare EVOH compositions in such a manner that the difference in the ethylene content and that in the degree of saponification between the two EVOHs both fall within predetermined ranges. The DSC charts of the EVOH compositions in those Examples 11 to 15 all give a single peak for crystal fusion, and those EVOH compositions attain the effect of the invention.

In the EVOH composition of which the DSC chart gives a plurality of peaks for crystal fusion, it is believed that the two EVOHs will be in a phase-separated condition. As a result, the moldings comprising the EVOH composition will have low transparency and poor delamination resistance.

Comparing the data in Examples 11, 12 and 13 with those in Examples 1, 6 and 7, it is known unexpectedly that the combination of two different EVOHS, between which the difference in the degree of saponification is from 1 to 8 significantly improves the gas barrier properties of the moldings with little increasing the frequency of delamination thereof. Therefore, combining such different EVOHs in the invention is especially effective.

As described in detail hereinabove, the coinjection stretch blow molded containers comprising a thermoplastic resin and an EVOH resin of the invention have greatly improved impact delamination resistance, while having good gas barrier properties against oxygen, carbon dioxide gas and others, good moisture-proofness, good aroma retentivity, good flavor barrier properties and good appearance, and are therefore favorably used as containers for drinks, foods, cosmetics, etc.

While the invention has been described in detail and with reference to specific embodiments thereof, it will be apparent to one skilled in the art that various changes and modifications can be made therein without departing from the spirit and scope thereof.

What is claimed is:

1. A coinjection stretch blow molded container, comprising a thermoplastic polyester layer (layer a) and an ethylene-vinyl alcohol copolymer layer (layer b), with the (layer a) being kept in direct contact with both surfaces of the (layer b), and having a configuration of the layers of one of a/b/a or a/b/a/b/a viewed in a cross-section of the container, wherein the X-ray photoelectron spectroscopy (XPS) of the surface of the (layer b) as exposed by peeling the layers a and b of the body of the container at their interface gives a pattern that satisfies the following formula (3):

$$0.015 \leq PC/(PA+PB+PC) \leq 0.3 \quad (3)$$

wherein:

PA represents the area of the highest peak (peak A) of the peaks for the binding energy of C1 electrons, PB represents the area of the peak (peak B) appearing in the side higher by from 1.1 to 1.8 eV than the position of the peak A, and PC represents the area of the peak (peak C) appearing in the side higher by from 3.6 to 4.3 eV than the position of the peak, and wherein the ethylene-vinyl alcohol copolymer is a mixture of two ethylene-vinyl alcohol copolymers (b1, b2) in a ratio by weight (b1/b2) falling between 10/90 and 90/10. and satisfies the following formulae (6) to (11):

$$25 \leq ETb1 \leq 48 \quad (6)$$

$$99 \leq SDb1 \quad (7)$$

$$25 \leq ETb2 \leq 48 \quad (8)$$

$$92 \leq SDb2 \leq 99 \quad (9)$$

$$|ETb2-ETb1| \leq 8 \quad (10)$$

$$1 \leq (SDb1-SDb2) \leq 8 \quad (11)$$

wherein:

ETb1 represents the ethylene content (mol %) of the ethylene-vinyl alcohol copolymer (b1), SDb1 represents the degree of saponification (%) of the ethylene-vinyl alcohol copolymer (b1), ETb2 represents the ethylene content (mol %) of the ethylene-vinyl alcohol copolymer (b2), and SDb2 represents the degree of saponification (%) of the ethylene-vinyl alcohol copolymer (b2).

2. The coinjection stretch blow molded container of claim 1, wherein the ethylene-vinyl alcohol copolymer satisfies the following formulae (1) and (2), and its differential scanning calorimetry (DSC) gives a single peak for crystal fusion:

$$25 \leq ETb \leq 48 \quad (1)$$

$$92 \leq SDB \leq 99 \quad (2)$$

wherein:

ETb represents the ethylene content (mol %) of the ethylene-vinyl alcohol copolymer, and SDb represents the degree of saponification (%) of the ethylene-vinyl alcohol copolymer.

3. The coinjection stretch blow molded container of claim 1, wherein the thermoplastic polyester has an intrinsic viscosity IVa (dl/g) that satisfies the following formula (4), and the ethylene-vinyl alcohol copolymer has a melt index M1b (g/10 min, at 190° C. under a load of 2,160 g) that satisfies the following formula (5):

$$0.60 \leq IVa \leq 0.90 \quad (4)$$

$$0.1 \leq M1b \leq 10 \quad (5).$$

4. The coinjection stretch blow molded container of claim 1, wherein the ethylene-vinyl alcohol copolymer is copolymerized with from 0.0002 to 0.2 mol % of a vinylsilane compound.

5. The coinjection stretch blow molded container of claim 1, wherein the ethylene-vinyl alcohol copolymer contains a boron compound in an amount of from 20 to 2,000 ppm in terms of the boron element.

6. The coinjection stretch blow molded container of claim 1, wherein the thermoplastic layer constituting its body has a density Da (g/cm$^3$) that satisfies the following formula (12), and the ethylene-vinyl alcohol copolymer layer constituting its body has a density Db (g/cm$^3$) that satisfies the following formula (13):

$$1.35 \leq Da \leq 1.37 \quad (12)$$

$$1.11 \leq Db \leq 1.20 \quad (13).$$

7. The coinjection stretch blow molded container of claim 1, wherein the thermoplastic polyester consists of an ethylene terephthalate component and its melting point TMa (° C.) satisfies the following formula (14):

$$240 \leq TMa \leq 250 \quad (14).$$

8. A coinjection stretch blow molded container of claim 1, wherein the thermoplastic polyester consists essentially of an ethylene terephthalate component and contains a naphthalenedicarboxylic acid component in an amount of from 0.1 to 15 mol % relative to the sum total of all dicarboxylic acid components constituting it.

9. The coinjection stretch blow molded container of claim 1, wherein the thermoplastic polyester is prepared through polymerization using a catalyst of a germanium compound.

10. The coinjection stretch blow molded container of claim 1, of which the body has a haze of at most 5%.

* * * * *